United States Patent
Fowe et al.

(10) Patent No.: US 11,341,512 B2
(45) Date of Patent: May 24, 2022

(54) DISTINGUISHING BETWEEN PEDESTRIAN AND VEHICLE TRAVEL MODES BY MINING MIX-MODE TRAJECTORY PROBE DATA

(71) Applicant: HERE GLOBAL B.V., Eindhoven (NL)

(72) Inventors: James Fowe, Chicago, IL (US); Harsh Yallapantula, East Windsor, NJ (US)

(73) Assignee: HERE Global B.V., Eindhoven (NL)

( * ) Notice: Subject to any disclaimer, the term of this patent is extended or adjusted under 35 U.S.C. 154(b) by 76 days.

(21) Appl. No.: 16/227,830

(22) Filed: Dec. 20, 2018

(65) Prior Publication Data
US 2020/0202366 A1 Jun. 25, 2020

(51) Int. Cl.
G06Q 30/02 (2012.01)

(52) U.S. Cl.
CPC .............................. G06Q 30/0201 (2013.01)

(58) Field of Classification Search
CPC ....................... G06Q 30/0201; G06Q 50/30
See application file for complete search history.

(56) References Cited

U.S. PATENT DOCUMENTS

| | | | |
|---|---|---|---|
| 8,015,144 B2 * | 9/2011 | Zheng | G06N 20/00 706/52 |
| 8,788,193 B2 | 7/2014 | Fauci et al. | |
| 9,285,388 B2 | 3/2016 | Bauchot et al. | |
| 9,683,858 B2 * | 6/2017 | Zheng | G01C 21/20 |
| 9,900,747 B1 * | 2/2018 | Park | H04W 4/029 |
| 9,911,326 B2 | 3/2018 | Xu et al. | |
| 10,317,538 B2 * | 6/2019 | Liu | G01S 19/28 |
| 10,546,490 B2 * | 1/2020 | Fowe | G08G 1/015 |
| 2007/0189181 A1 * | 8/2007 | Kirk | H04L 67/12 370/252 |
| 2011/0066364 A1 * | 3/2011 | Hale | G01C 21/3423 701/533 |
| 2011/0106423 A1 * | 5/2011 | Morley | G01C 21/3423 701/533 |

(Continued)

OTHER PUBLICATIONS

Sauerlander-Biebl, Anke et al., Evaluation of transportation mode detection using fuzzy rules Transportation Research Procedia, vol. 25, 2017 (Year: 2017).*

(Continued)

*Primary Examiner* — Scott L Jarrett
(74) *Attorney, Agent, or Firm* — Ditthavong, Steiner & Mlotkowski

(57) ABSTRACT

An approach is provided for mining pedestrian probe data from mix-mode probe data. The approach involves, for example, receiving a probe trajectory including a vehicle mode of travel, a pedestrian mode of travel, or a combination thereof. The approach also involves processing the probe trajectory to determine at least one speed value and at least one sinuosity value. The approach further involves determining a pedestrian probe detection metric based on the at least one speed value and the at least one sinuosity value. The approach further involves ranking the probe trajectory among a plurality of probe trajectories based on the pedestrian probe detection metric and/or classifying the probe trajectory as either a vehicle probe trajectory or a pedestrian probe trajectory based on the pedestrian probe detection metric.

15 Claims, 18 Drawing Sheets

(56) References Cited

U.S. PATENT DOCUMENTS

| | | | | |
|---|---|---|---|---|
| 2012/0253656 | A1* | 10/2012 | Brandt | G01C 21/20 |
| | | | | 701/410 |
| 2012/0265432 | A1* | 10/2012 | Ashby | G07C 5/0858 |
| | | | | 701/410 |
| 2015/0170514 | A1* | 6/2015 | Stenneth | G08G 1/0133 |
| | | | | 701/117 |
| 2015/0198722 | A1* | 7/2015 | Ben-Akiva | G01S 5/0294 |
| | | | | 701/472 |
| 2015/0285639 | A1 | 10/2015 | Basalamah et al. | |
| 2016/0292999 | A1* | 10/2016 | Watts-Fitzgerald | |
| | | | | G08G 1/0129 |
| 2016/0293001 | A1* | 10/2016 | Xu | G08G 1/0133 |
| 2017/0167889 | A1* | 6/2017 | Kaplan | G01C 21/3697 |
| 2017/0174224 | A1* | 6/2017 | Hoare | B62D 15/028 |
| 2017/0336213 | A1* | 11/2017 | Fowe | B60W 30/143 |
| 2018/0061150 | A1* | 3/2018 | Harish | G06Q 40/08 |
| 2018/0315147 | A1* | 11/2018 | Mendels | G06Q 50/26 |
| 2018/0349411 | A1* | 12/2018 | Hui | G06F 16/29 |

OTHER PUBLICATIONS

Yang, Xue et al., A Review of GPS Trajectories Classification Based on Transportation Mode Sensors, Nov. 2, 2018 (Year: 2018).*

Su, Xing, Travel Mode Identification with Smartphone Sensors City University of New York, Jun. 2017 (Year: 2017).*

Edelhoff, Hendrik et al., Path segmentation for beginners: an overview of current methods for detecting changes in animal movements, Movement Ecology, vol. 4, No. 21, 2016 (Year: 2016).*

Huss, Anke et al., Using GPS-derived speed pattern recognition of transportation modes in adults International Journal of Health Geographics, vol. 13, No. 40, 2014 (Year: 2014).*

Zheng, Yu, Trajectory Data Mining: An Overview Microsoft Research, ACM Intelligent Systems Technology, vol. 6, No. 3, May 2015 (Year: 2015).*

Das, Rahul Deb et al., Automated Urban Travel Interpretation: A Bottom-up Approach for Trajectory Segmentation Sensors, Nov. 2016 (Year: 2016).*

Office Action for corresponding European Patent Application No. 19218271.5-1001, dated Apr. 29, 2020, 10 pages.

Zhang et al., "Multi-Stage Approach to Travel-Mode Segmentation and Classification of GPS Traces", International Archives of the Photogrammetry, Remote Sensing and Spatial Information Sciences, vol. XXXVIII-4/W25, Aug. 30, 2012, pp. 87-93.

Dodge et al., "Revealing the Physics of Movement: Comparing the Similarity of Movement Characteristics of Different Types of Moving Objects", vol. 33, No. 6, Nov. 2009, pp. 419-434.

Dabiri et al., "Inferring Transportation Modes from GPS Trajectories Using a Convolutional Neural Network", Transportation Research Part C: Emerging Technologies, vol. 86, Jan. 2018, pp. 360-371.

Xiao et al., "Identifying Different Transportation Modes from Trajectory Data Using Tree-based Ensemble Classifiers", Article, ISPRS International Journal of Geo-Information, 2017, vol. 6, Issue 2, pp. 1-22.

Kurkcu et al., "Estimating Pedestrian Densities, Wait Times and Flows Using Wi-fi and Bluetooth Sensors", Transportation Research Record: Journal of the Transportation Research Board, No. 2644, 2017, pp. 72-82.

* cited by examiner

901

DISTINGUISHING BETWEEN PEDESTRIAN AND VEHICLE TRAVEL MODES BY MINING MIX-MODE TRAJECTORY PROBE DATA

BACKGROUND

Mobile navigation/mapping applications and devices (e.g., smartphones, personal navigation devices, etc.) are extensively used by consumers. One increasingly common function of these applications and devices is to collect probe data or trajectory data that indicate the travel paths of individual applications or devices as a sequence of location points (e.g., GPS location points). However, because mobile applications and devices are generally carried by a user, the collected probe data can potentially span different modes of travel used by the user (e.g., mix-mode probe data). For example, the probe data can potentially include a vehicle mode of travel (e.g., when the user drives to a parking space near a destination) as well as pedestrian mode of travel (e.g., when the user walks from the parking space to reach the destination). This type of mix-mode probe data can make it technically challenge for service providers to use mix-mode probe data to develop navigation/mapping services and products targeted individually to pedestrians or vehicles.

SOME EXAMPLE EMBODIMENTS

Therefore, there is a need for an approach for mining either pedestrian probe data or vehicle probe data from mix-mode probe data.

According to one embodiment, a method comprises receiving a probe trajectory including a vehicle mode of travel, a pedestrian mode of travel, or a combination thereof. The method also comprises processing the probe trajectory to determine at least one speed value and at least one sinuosity value. The method further comprises determining a pedestrian probe detection metric based on the at least one speed value and the at least one sinuosity value. The method further comprises ranking the probe trajectory among a plurality of probe trajectories based on the pedestrian probe detection metric and/or classifying the probe trajectory as either a vehicle probe trajectory or a pedestrian probe trajectory based on the pedestrian probe detection metric.

According to another embodiment, an apparatus comprises at least one processor, and at least one memory including computer program code for one or more computer programs, the at least one memory and the computer program code configured to, with the at least one processor, cause, at least in part, the apparatus to receive a probe trajectory including a vehicle mode of travel, a pedestrian mode of travel, or a combination thereof. The apparatus is also caused to process the probe trajectory to determine at least one speed value and at least one sinuosity value. The apparatus is further caused to determine a pedestrian probe detection metric based on the at least one speed value and the at least one sinuosity value. The apparatus is further caused to rank the probe trajectory among a plurality of probe trajectories based on the pedestrian probe detection metric and/or classify the probe trajectory as either a vehicle probe trajectory or a pedestrian probe trajectory based on the pedestrian probe detection metric.

According to another embodiment, a computer-readable storage medium carries one or more sequences of one or more instructions which, when executed by one or more processors, cause, at least in part, an apparatus to receive a probe trajectory including a vehicle mode of travel, a pedestrian mode of travel, or a combination thereof. The apparatus is also caused to process the probe trajectory to determine at least one speed value and at least one sinuosity value. The apparatus is further caused to determine a pedestrian probe detection metric based on the at least one speed value and the at least one sinuosity value. The apparatus is further caused to rank the probe trajectory among a plurality of probe trajectories based on the pedestrian probe detection metric and/or classify the probe trajectory as either a vehicle probe trajectory or a pedestrian probe trajectory based on the pedestrian probe detection metric.

According to another embodiment, an apparatus comprises means for receiving a probe trajectory including a vehicle mode of travel, a pedestrian mode of travel, or a combination thereof. The apparatus also comprises means for processing the probe trajectory to determine at least one speed value and at least one sinuosity value. The apparatus further comprises means for determining a pedestrian probe detection metric based on the at least one speed value and the at least one sinuosity value. The apparatus further comprises means for ranking the probe trajectory among a plurality of probe trajectories based on the pedestrian probe detection metric and/or classifying the probe trajectory as either a vehicle probe trajectory or a pedestrian probe trajectory based on the pedestrian probe detection metric.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for mining pedestrian and/or vehicle probe data from mix-mode probe data is disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
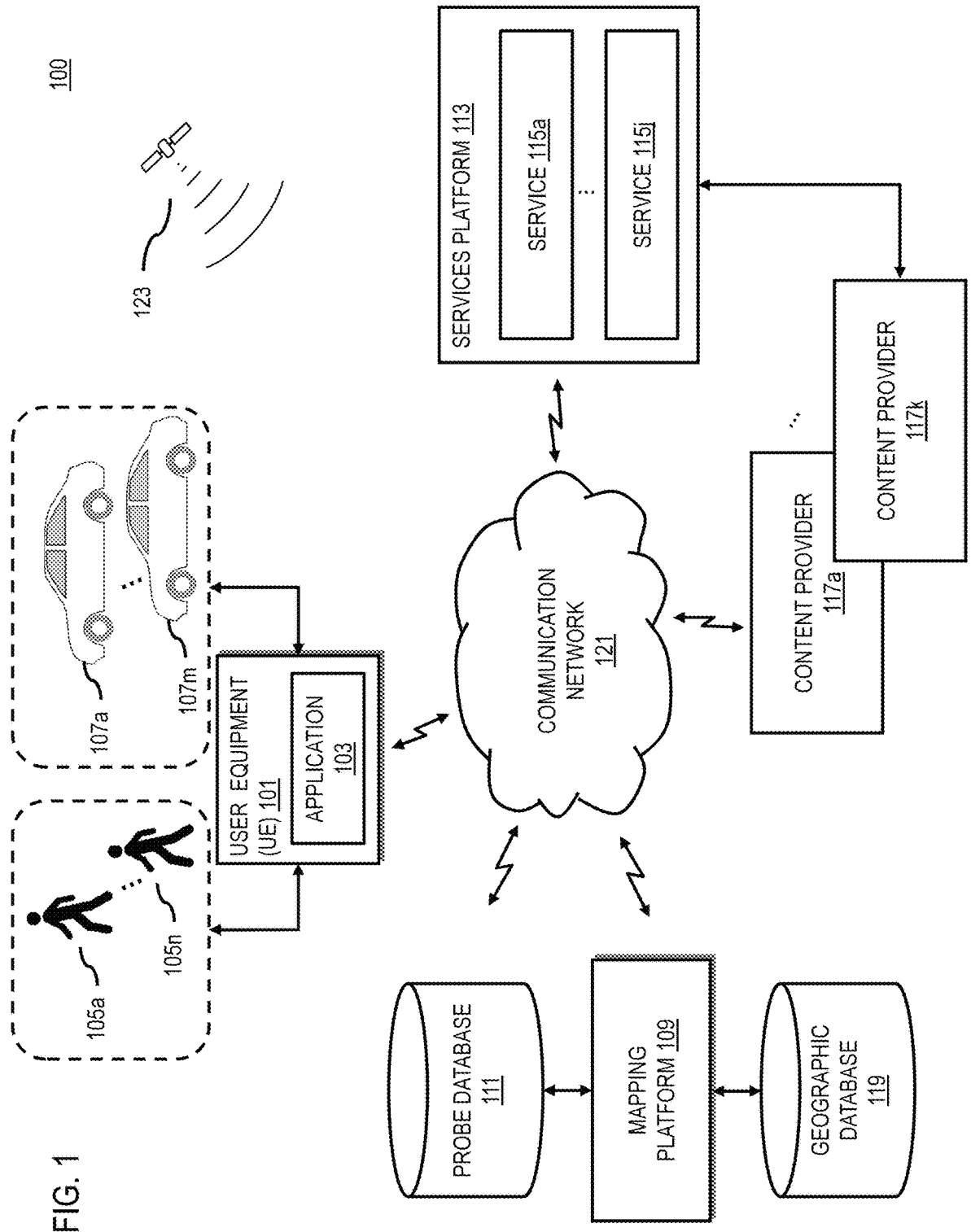
FIG. 1 is a diagram of a system for mining pedestrian and/or vehicle probe data from mix-mode probe data, according to one embodiment.

FIG. 1 is a diagram of a system for mining pedestrian and/or vehicle probe data from mix-mode probe data, according to one embodiment. The various embodiments described herein are related to probe data mining for automatic detection of pedestrian and/or vehicle probe trajectories from probe trajectories with mixture of vehicle probes (e.g., collected while in driving mode) and pedestrian probes (e.g., collected while in walking mode). In one embodiment, probe data refers to data representing travel path trajectories sensed by, for instance, a user equipment (UE) 101 (e.g., smartphone, personal navigation device, etc.) executing a mobile application 103 that collects. The trajectory is represented as a sequence of probes (e.g., a location point, <latitude, longitude, altitude> sensed by a GPS sensor or other location sensor of the UE 101) grouped according to a Probe ID or other identifier specific to the UE 101, user of the UE 101 (e.g., pedestrians 105a-105n, also collectively referred to as pedestrians 105), or vehicles 107a-107m (also collectively referred to as vehicles 107) in which the user or corresponding UE 101 is riding.

In one embodiment, a mapping platform 109 can collect and store the probe data generated by the UE 101 carried by pedestrians 105 and/or vehicles 107 in a probe database 111 or equivalent data store. As discussed above, because a typical user can carry the UE 101 through any number of possible modes of travel (e.g., pedestrian mode of travel while the user is a pedestrian 105, a vehicle mode of travel while the user is traveling in a vehicle 107 such as a car, bus, train, etc.), the mobile application 103 executing on the UE 101 may collect probe data that is 100% pedestrian mode of travel, 100% vehicle mode of travel, or a mixture somewhere between (i.e., mix mode probe data). In one embodiment, mix mode probe data refers to both an individual probe trajectory having multiple modes of travel as well as collection of multiple probe trajectories that includes probe trajectories of different composition (e.g., 100% pedestrian, 100% vehicle, or a mix). However, because the type of mapping/navigation services and applications that are provided to end users often depends on the users' mode of travel, distinguishing between pedestrian probe data and vehicle probe data presents service providers with significant technical challenges.

For example, one limitation to capturing pedestrian flow or trajectory from mix mode probes (e.g., GPS probes) is the spatial errors of the probe data which make it technically difficult to for the mapping platform 109 to determine if a moving data source (e.g., a mobile application 103) is a pedestrian 105 walking or someone driving in a vehicle 107 in traffic congestion, etc. As noted, many location aware mobile applications 103 are now able to obtain location probe data (e.g., GPS probe data). One problem is that this probe data usually comes as a mix of both car and pedestrian modes. The capability to automatically determine if a probe trajectory has more pedestrian data is therefore important so that pedestrian heavy trajectories can be used for pedestrian flow modelling applications, while the probe trajectories that have more car data can be used for traffic flow modelling. In other words, differences in mode of travel can be used to differentiate the services or applications that are presented to users (e.g., presenting different content or advertisement data to pedestrians versus drivers).

Historically, there has been a large amount of available probe data or probe trajectories that are mix-mode that cannot be used directly for pedestrian-specific (or vehicle-specific) applications without either resulting in reduced accuracy or performance. Traditional options for generating pedestrian-specific probe data have include, for instance: (1) expending considerable resources to manually separate pedestrian data from the mix-mode probe data; and (2) paying considerably more money to buy pedestrian-only probe data (which currently is not easy to find) relative to cheaper and more abundant mix-mode probe data. In addition to the expense of buying pedestrian only data, maintaining separate databases of pedestrian probe data, vehicle probe data, and/or mix-mode probe data can consume unnecessary computer storage, processing, and/or bandwidth resources.

To address these technical problems, the system 100 of FIG. 1 introduces a capability to extract or classify raw mix-mode probe trajectories into vehicle probe data and/or pedestrian probe data by generating a metric (e.g., a pedestrian probe detection metric, hereinafter "PDM") which measures the intrinsic properties of a probe trajectory (or segment thereof) which describes how pedestrian heavy the probe trajectory is. By using intrinsic properties of the probe trajectory, the system 100 advantageously avoids use of resource-intensive processes such as map-matching of the probe trajectory to pedestrian versus vehicle travel paths. Thus, the various embodiments further reduce the computational resources that would otherwise be used for map-matching.

Figure 2:
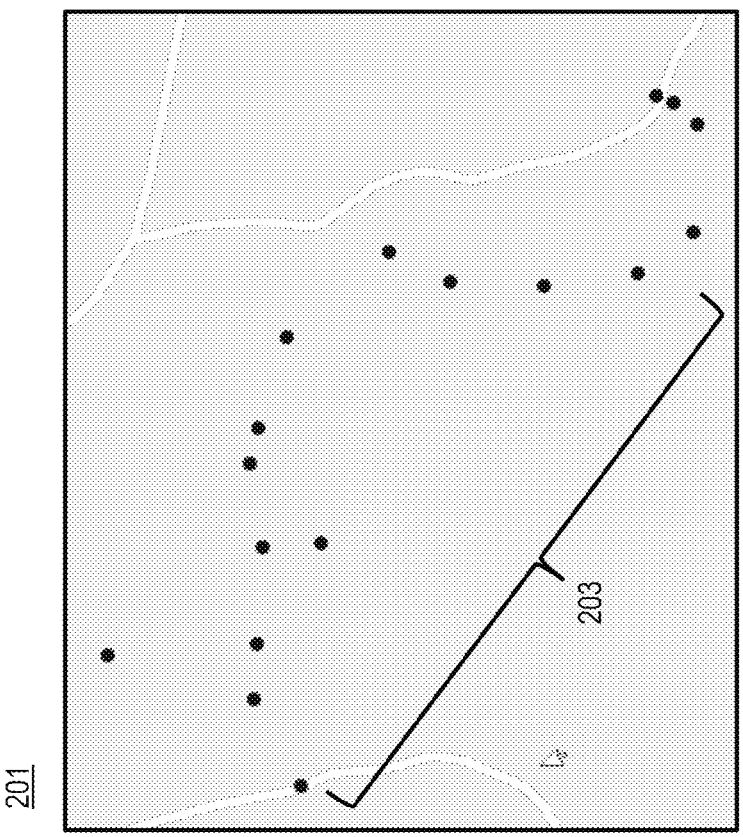
FIG. 2 is a diagram of depicting an example of a pedestrian probe trajectory, according to one embodiment.

In one embodiment, an intrinsic property is property of the probe trajectory that can be determined or calculated from the probe trajectory data without reference to other data not included in the probe data. The system 100, for instance, can select intrinsic properties that can be used to distinguish pedestrian from non-pedestrian (e.g., vehicular) travel to generate the PDM for classifying probe data into pedestrian versus vehicle probe data. FIG. 2 is a diagram of depicting an example of a pedestrian probe trajectory 201, according to one embodiment. As shown, the pedestrian probe trajectory 201 includes a sequence 203 of individual probes (e.g., illustrated as black does corresponding to sampled GPS location points collected by an individually identified mobile application 103). The pedestrian probe trajectory 201 exhibits properties such as sinuosity (e.g., the number of turns and the respective angles of the turns) that can be characteristic of the pedestrian probe trajectories. Other intrinsic properties include but are not limited to the average standard deviation of probe speed (e.g., pedestrian trajectories typically have higher standard deviations) and average probe speed (e.g., pedestrian trajectories typically have lower average speeds than vehicle trajectories).

Accordingly, the system 100 can process individual trajectories or segments/chunks thereof to determine selected intrinsic properties (e.g., probe speed properties, sinuosity property) and calculate a PDM to classify how pedestrian heavy a probe trajectory of interest is. In one embodiment, the PDM uses the speeds of all the probes in a trajectory to find their standard deviation (SD) and average speed (or velocity V) and computes the trajectories sinuosity (S) which is a function of how sharp the turning angles of the probes (e.g., GPS probe) are. A combination of these three parameters is used to generate a PDM value for each trajectory. For example, the system 100 can use the following equation to calculate the PDM:

$$PDM = \frac{\sigma \cdot S}{V^2}$$

wherein, $\sigma$ is the standard deviation of probe speed in the probe trajectory, S is the calculated sinuosity of the probe trajectory, and $V^2$ is the square of the average speed or velocity of the probes in the probe trajectory. It is not that the equation above is proved by way of illustration and not as a limitation. Other equivalent equations can be used provided that increased $\sigma$ and S result in increasing the PDM and increased V results in decreasing the PDM.

In one embodiment, the system 100 can use the PDM to extract pedestrian probe trajectories from mix-mode probe data. For example, the system 100 can extract probe trajectories by applying a threshold to PDM, wherein trajectories with a calculated PDM above the threshold are classified and extracted probe trajectories. In addition or alternatively, the system 100 can automatically rank large amounts of raw probe trajectories according to how pedestrian heavy the trajectories are based on their respective calculated PDM. The system can then select the top-ranking trajectories as pedestrian probe trajectories.

By extracting pedestrian probe trajectories from currently available and abundant mix-mode probe data using the PDM, the system 100 can reduce the resources that would otherwise be needed to generate and maintain pedestrian specific probe data using traditional processes. In addition, the system 100 can result in substantial monetary savings by avoiding the purchase of pedestrian-specific probe data to source probe data for pedestrian-centric products and services. Beyond this, there is opportunity to sell this data to many customers on our OLP market place. In one embodiment, the system 100 can divide a probe trajectory into segments or chunks, and then determine the PDM for individual chunks or segments. In other words, the system 100 can slice a mix-mode probe trajectory to separate and separate the pedestrian portion from the vehicle portion of the probe trajectory.

Figure 3:
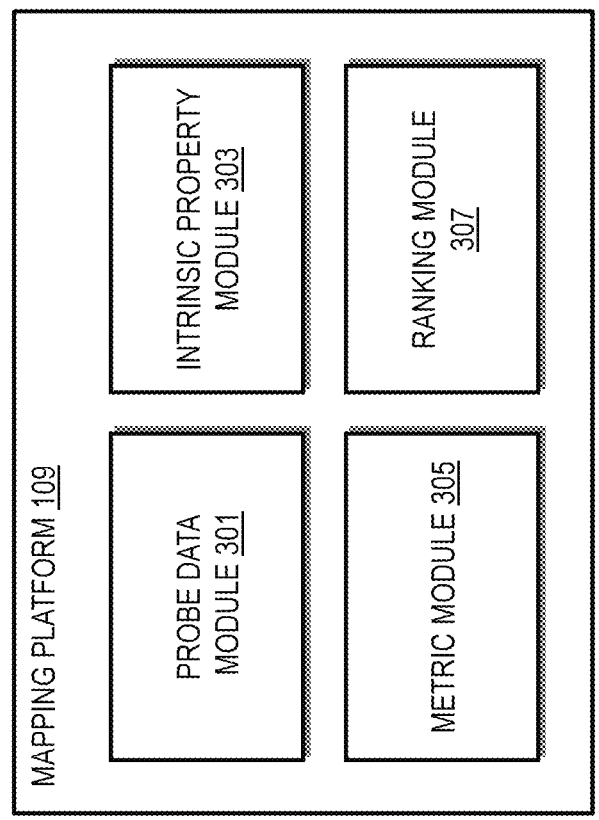
FIG. 3 is a diagram of a mapping platform capable of mining pedestrian and/or vehicle probe data from mix-mode probe data, according to one embodiment.

In one embodiment, as shown in FIG. 3, the mapping platform 109 of the system 100 includes one or more components for mining pedestrian or vehicle probe data from mix-mode probe data according to the various embodiments described herein. It is contemplated that the functions of these components may be combined or performed by other components of equivalent functionality. As shown, in one embodiment, the mapping platform 109 includes a probe data module 301, an intrinsic property module 303, a metric module 305, and a ranking module 307. The above presented modules and components of the mapping platform 109 can be implemented in hardware, firmware, software, or a combination thereof. Though depicted as a separate entity in FIG. 1, it is contemplated that the mapping platform 109 may be implemented as a module of any of the components of the system 100 (e.g., a component of the UE 101, application 103, services platform 113, services 115a-115j (also collectively referred to as services 115), etc.). In another embodiment, one or more of the modules 301-307 may be implemented as a cloud-based service, local service, native application, or combination thereof. The functions of the mapping platform 109 and modules 301-307 are discussed with respect to FIGS. 4-10 below.

Figure 4:
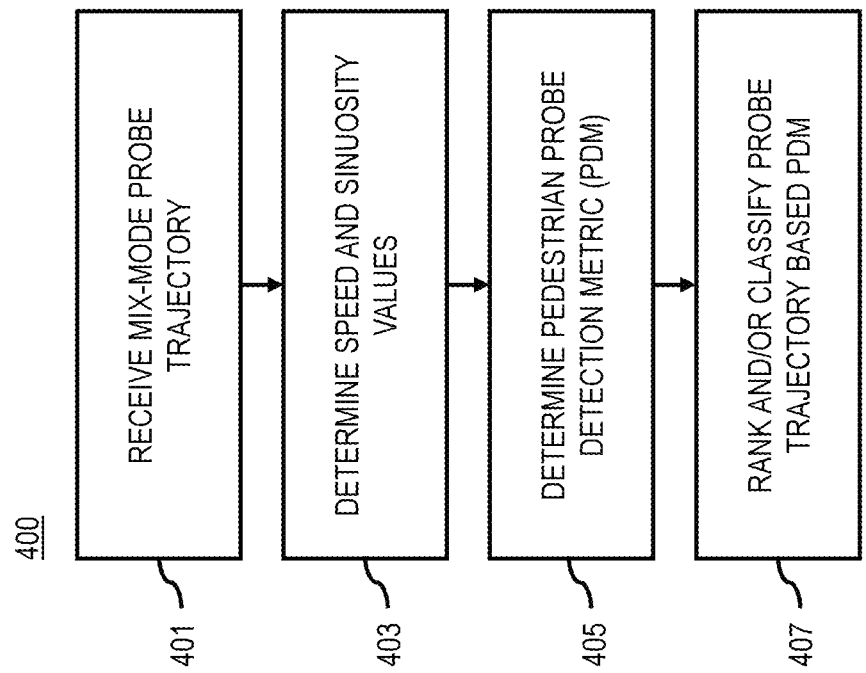
FIG. 4 is a flowchart of a process for mining pedestrian and/or vehicle probe data from mix-mode probe data.
Figure 14:
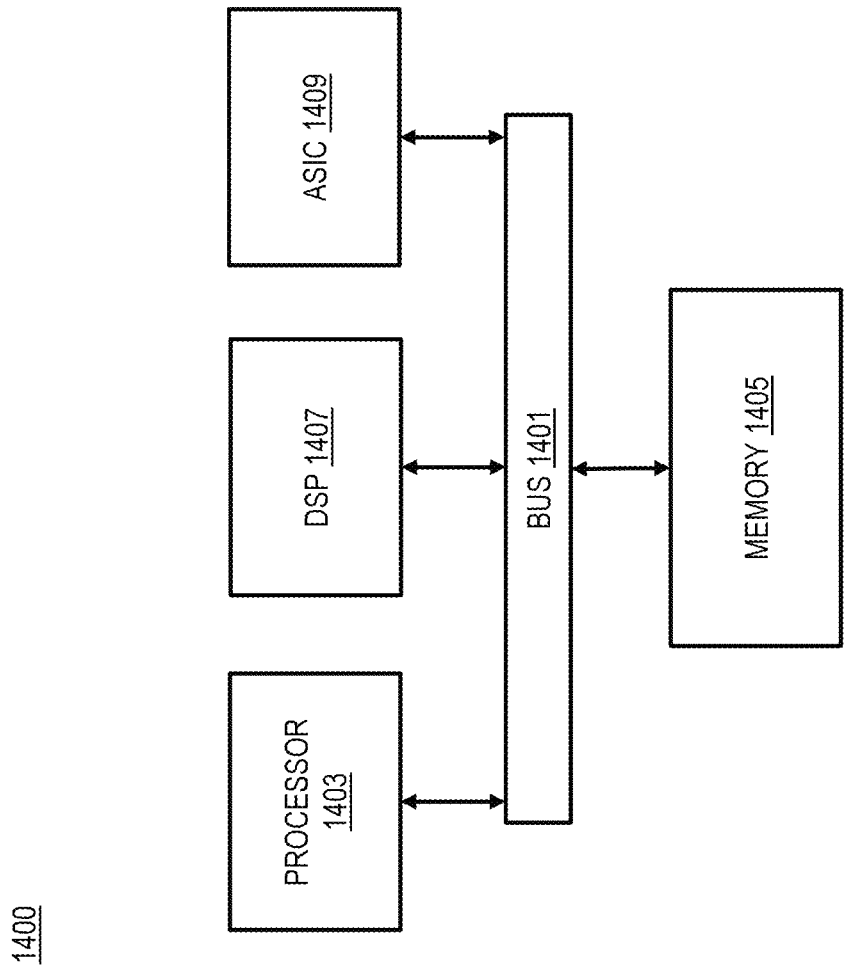
FIG. 14 is a diagram of a chip set that can be used to implement an embodiment of the invention.

FIG. 4 is a flowchart of a process for mining pedestrian and/or vehicle probe data from mix-mode probe data. In various embodiments, the mapping platform 109 and/or any of the modules 301-307 may perform one or more portions of the process 400 and may be implemented in, for instance, a chip set including a processor and a memory as shown in FIG. 14. As such, the mapping platform 109 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the probe data module 301 receives a probe trajectory that is mix-mode. For example, the received probe trajectory can include a vehicle mode of travel, a pedestrian mode of travel, or a combination or mix thereof. It is noted that although the process 400 is describe with respect to one probe trajectory, it is contemplated that embodiments of the process 400 are also application to bundles or sets of multiple probe trajectories collected using sensors of the UE 101, vehicle 107, and/or any other associated device. As discussed above mix-mode probe data in this case refers to data collected from a mobile application 103 or equivalent whereby a user is able move between different modes of travel (e.g., from driving to walking and vice versa). This multi-mode travel is then recorded as the probe trajectory for processing according to the embodiments described herein. It is contemplated that the composition of the probe trajectory need not be known prior to processing according to the embodiments described herein. In other words, the probe data can be processed to determine the composition of pedestrian probes (if any) in the probe trajectory of interest.

In one embodiment, the probe trajectory can be provided or received in real-time or substantially real-time (e.g., within a designated time period corresponding to a most recent time epoch). Alternatively, the mapping platform 109 can collect and then store probe trajectory data in the probe database 111 for offline batch processing. In other embodiments, the probe trajectory can be part of a probe data received from external providers such as but not limited to the services platform 113, services 115, and/or content providers 117a-117k (also collectively referred to as content providers 117). For example, the services platform 113 and/or content providers 117 can accumulate repositories of "big data" probe data that is can be purchased or otherwise accessed by the mapping platform for mining pedestrian and/or vehicle specific probe data.

In step 403, the intrinsic property module 303 processes the probe trajectory to determine intrinsic properties that are indicative of pedestrian probe data. For example, the intrinsic probe data can include but is not limited at least one speed value and at least one sinuosity value calculated from the probe trajectory. In one embodiment, the main components or intrinsic properties determined used for calculating the PDM are for instance:

(1) Average speed/velocity (V): this is obtained either by using the probe (instantaneous speeds) or by finding the displacement between raw GPS probes and dividing it by the time difference. The average is obtained from all or a designated number of the speeds from a particular probe trajectory.

(2) Speed standard deviation (SD or σ): this is the standard deviation obtained from the set of probe speeds.

(3) Sinuosity (S): this is a function that measures how many turns a probe trajectory made or how zig-zaggy the probe trajectory is.

Figure 5A:
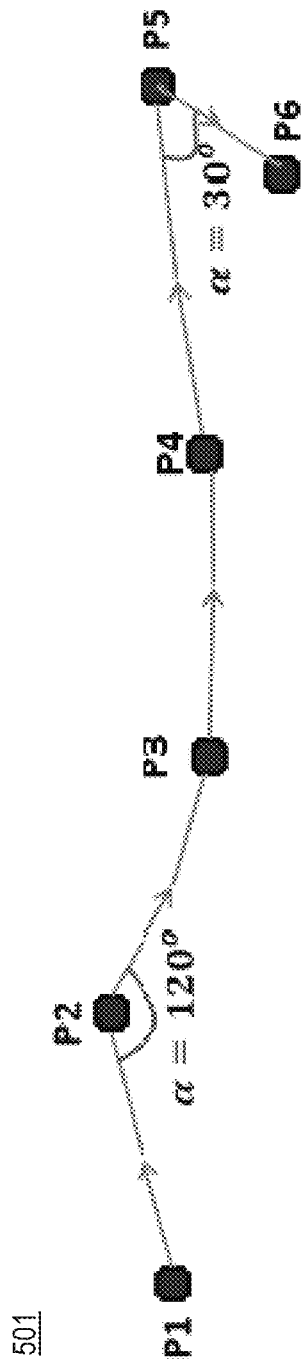
FIGS. 5A and 5B are diagrams illustrating example sinuosities of different probe trajectories, according to one embodiment.
Figure 5B:
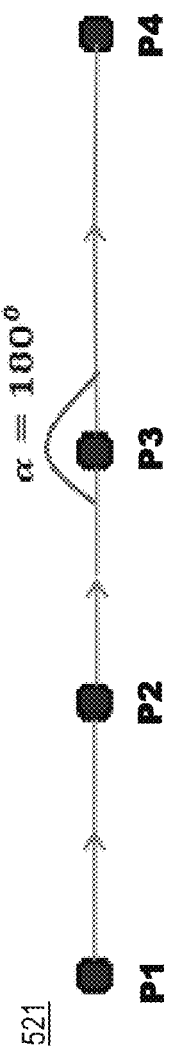

FIGS. 5A and 5B are diagrams illustrating example sinuosities of different probe trajectories, according to one embodiment. In one embodiment, the intrinsic property module 303 determines sinuosity based on the number and magnitude of turn angles exhibited by a probe trajectory. In the example of FIG. 5A, a probe trajectory 501 includes probes P1-P6 with turns centered at P2 and P5. For example, the turn angle (a) at P2 (e.g., formed by a segment from P1 to P2 as one side and a segment from P2 to P3 as another side of the angle) is 120°, and the turn angle (a) at P5 is 30°. When compared to the probe trajectory 521 shown in FIG. 5B, the probe trajectory 501 is more sinuous because it has more turns at different turn angles. For example, the less sinuous probe trajectory 521 includes probes P1-P4 with no turns as illustrated at probe P3 which has a 180° turn angle (a) (i.e., a straight line) connecting the segment from P2 to P3 and the segment P3 to P4.

In one embodiment, the intrinsic property module 303 can use any combination of number of turns and turn angles of the probe trajectory to quantitatively determine the probe trajectory sinuosity. One example sinuosity function is provided below:

$$\text{Sinuosity}(S) = \frac{\sum_{i=1}^{n} |\cos(\frac{\alpha_i}{2})|}{n}$$

where n=total number of turn angles in a probe trajectory (e.g., total number of probes N=n+2; and $\alpha_i$ is the turn angle at each turn angle i in the probe trajectory.

Figure 6:
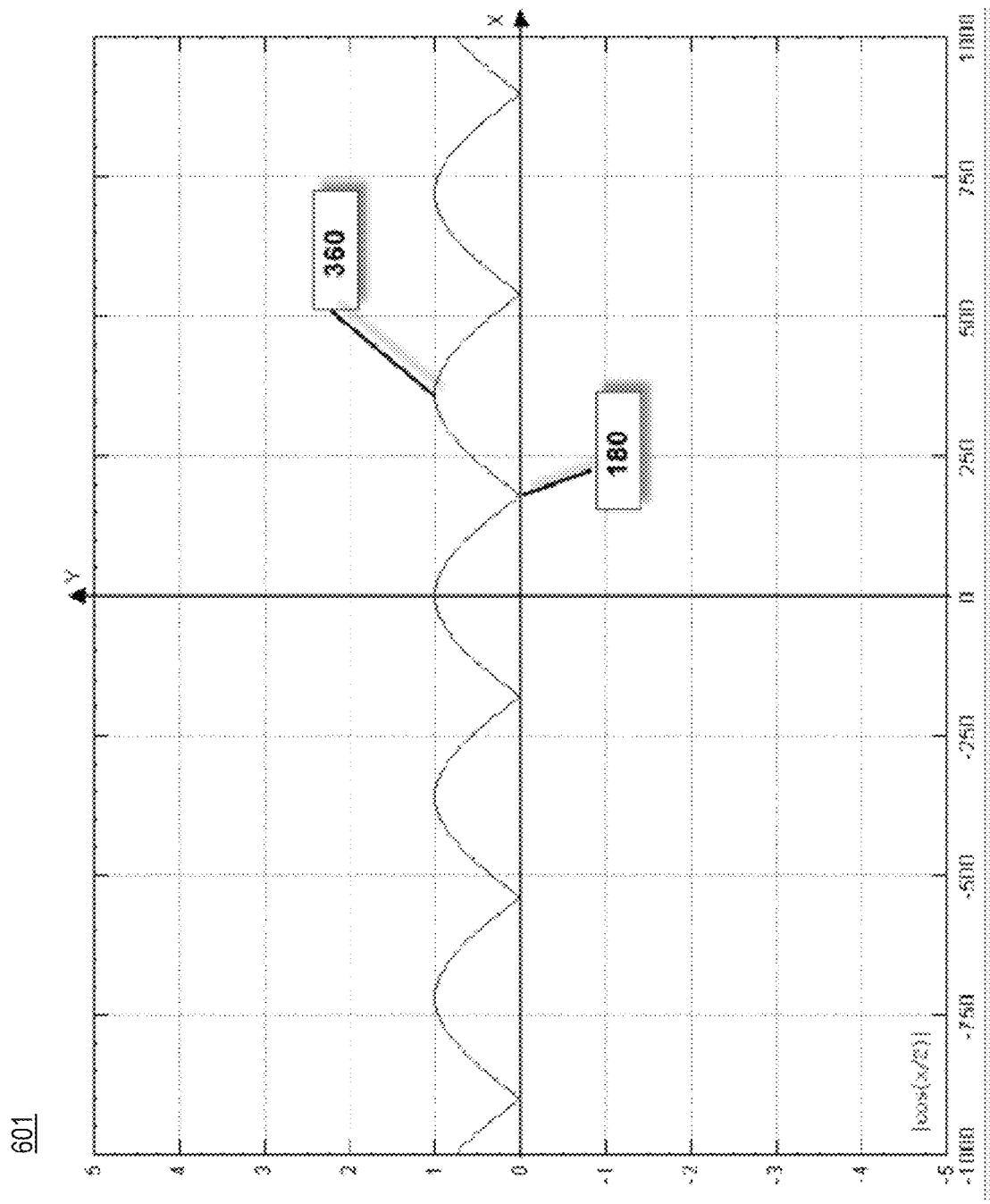
FIG. 6 is a diagram illustrating an example sinuosity plot, according to one embodiment.

As shown in FIG. 6, a plot 601 illustrates the structure of the cosine formula of the sinuosity function above. The X-axis indicates the turn angle (α) in degrees, and the Y-axis indicates the cosine of the turn angle (α) (e.g., based on |cos x/2|). The plot 601 indicates that the smaller the value of the turn angles ($\alpha_i$), the higher the sinuosity. Hence, the higher the sinuosity of a probe trajectory, the curvier or zig-zaggy the probe trajectory is.

In step 405, after determining the intrinsic properties of the probe trajectory of interest, the metric module 305 determines a pedestrian probe detection metric (PDM) based on the intrinsic property or parameter values (e.g., the at least one speed value and the at least one sinuosity value described in the embodiments above). In one embodiment, the metric module 305 can use a function or process to determine the PDM from the intrinsic properties. One example of a PDM function is provided below:

$$PDM = \frac{SD \times \text{Sinuosity}}{(avg.\text{ Speed})^2} = \frac{\sigma \cdot S}{V^2}$$

where the standard deviation of the speed of the probes in the probe trajectory is SD or σ, the average speed or velocity is "avg. Speed" or V, and the sinuosity is S.

By way of example, the embodiments of the PDM function described herein are based on a general observation that pedestrian probe trajectories will have a more sinuous trace as humans do not generally walk in perfectly straight lines and tend to make more turns and deviations than cars. This coupled with location sensor noise (e.g., GPS noise) makes a pedestrian trajectory intrinsically more sinuous than that of vehicles on a road. Although the speed standard deviation of pedestrians is also expected to be higher than that of cars, this intrinsic property is included to detect probe trajectories where there is both driving mode and pedestrian mode (e.g., when a user walks and enters the car). In other embodiments, different intrinsic properties can be used such as but not limited to the probe heading standard deviation of the probe trajectory instead of or in addition to the probe speed standard deviation.

In one embodiment, the metric module 305 can determine or compute the PDM for each probe trajectory in a set of probe data and/or for sub-segments of individual probe trajectories in addition to or in place of a full individual probe trajectory.

In step 407, after calculating the PDM for the probe trajectory of interest or a set of probe trajectories, the ranking module 307 ranks the probe trajectory among a plurality of probe trajectories based on the PDM. In addition or alternatively, the classification module 307 ranks and/or classifies probe trajectory as either a vehicle probe trajectory or a pedestrian probe trajectory based on the pedestrian probe detection metric.

In one embodiment, one use case for the PDM is for ranking potentially millions of pedestrian probe trajectories (e.g., that may be available to the mapping platform 109) according to how mostly pedestrian they are, i.e., the higher the PDM the more pedestrian probes they have. This can help in mining pedestrian data from a probe data archive by, for instance, ranking trajectories using PDM and then selecting the top X % (e.g., a designated percentage) of the data and using the selected pedestrian heavy trajectories for developing for pedestrian-related products (e.g., pedestrian navigation/mapping, targeted pedestrian content, etc.). This will give the mapping platform 109 confidence that the pedestrian data being used contains fewer outliers (e.g., probe trajectories containing car/driving data) and hence gives a more refined output for pedestrian applications and services.

In one embodiment, the ranking module 307 can also use PDM for classification of probe trajectories depending on available data. For example, using a machine learning approach with several training data sets, the ranking module 307 can obtain the predicted optimal value of a PDM threshold T that can be used for probe trajectory classification. In one embodiment, all trajectories with a PDM>T are classified as pedestrian, and those with PDM<T are classified as vehicle or non-pedestrian.

Figure 7:
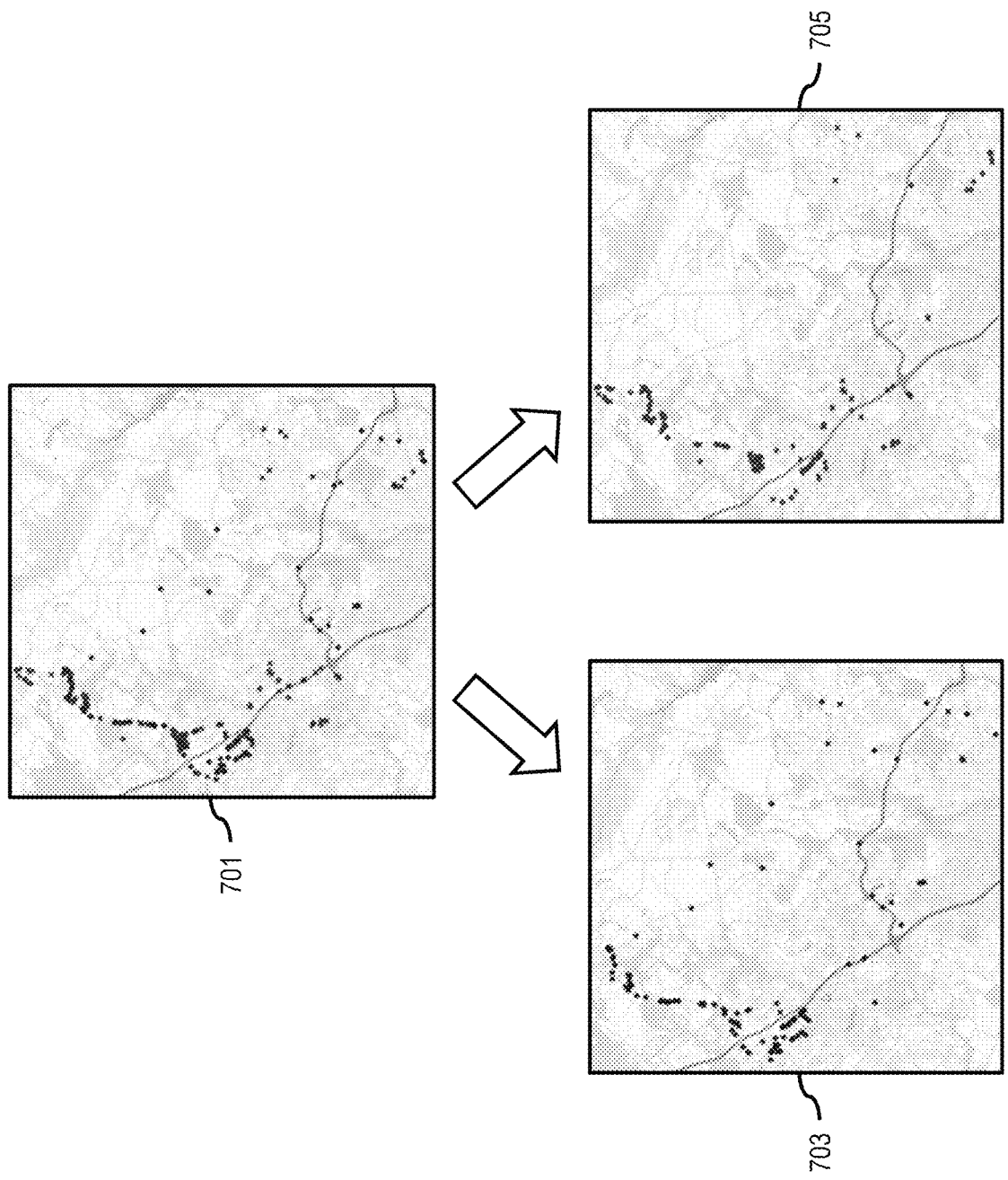
FIG. 7 is a diagram illustrating example pedestrian and vehicle probe data mined from mix-mode probe data, according to one embodiment.

In one example use case on a set of example probe data, the ranking module 307 calculated a predicted PDM threshold value of 0.03 using the embodiments of the machine learning approach described herein. FIG. 7 is a diagram illustrating example pedestrian and vehicle probe data mined from mix-mode probe data (e.g., using the PDM threshold), according to one embodiment. In the example of FIG. 7, probe data 701 includes a mix of pedestrian and vehicle probes. The mapping platform 109 is then used to process the probe data 701 to calculate respective PDM for the probe trajectories in the combined or mix-mode probe data 701. Based on the calculated PDM, the mapping platform 109 applies a PDM threshold (e.g., a threshold value of 0.03) to classify probe trajectories as either pedestrian or vehicle. The mapping platform 109 then extracts the probe trajectories or probes whose PDM is below the PDM threshold to create a vehicle probe data 703, and extracts the probe trajectories or probes whose PDM is above the PDM threshold to create the pedestrian probe data 705. Each of the extracted vehicle probe data 703 and/or pedestrian probe data 703 can then be output or transmitted to respective vehicle or pedestrian processes to create either vehicle or pedestrian related services and applications.

In the use case described above, the machine learning process to determine a PDM threshold is based on training a machine learning model with ground truth data comprising known pedestrian probe trajectories and known vehicle probe trajectories. For example, field personnel or known users with known mode of travel can be monitored to collect ground truth probe data. In a use case where field-collected ground truth data is not available, ground truth data can be synthesized by manually selecting (e.g., using human labelers) a designated number of probe trajectories (e.g., 10 trajectories) that visually look pedestrian and an equal number of trajectories that look like a vehicle. Embodiments of the PDM determination process can then be used to rank the trajectories. The mapping platform 109 can use the determined PDM threshold (e.g., PDM classification threshold=0.03) to classify the probe trajectories as pedestrian or vehicle. When applied to the example data set, the classification results, sorted in increasing order by PDM, were very accurate, as shown in Table 1 below.

TABLE 1

| Probe ID | AVG SPEED | STD SPEED | SINUOSITY | PDM | GROUND TRUTH | PREDICTED |
|---|---|---|---|---|---|---|
| 50_2 | 85.8208 | 27.3896 | 0.1136 | 0.000422 | Vehicle | Vehicle |
| 107 | 89.3869 | 43.8128 | 0.1515 | 0.000830 | Vehicle | Vehicle |
| 23 | 71.9397 | 43.2187 | 0.1805 | 0.001509 | Vehicle | Vehicle |
| 22 | 55.0526 | 33.5778 | 0.1790 | 0.001984 | Vehicle | Vehicle |
| 105 | 32.1957 | 21.0440 | 0.1043 | 0.002119 | Vehicle | Vehicle |
| 24 | 55.3053 | 43.1215 | 0.2008 | 0.002832 | Vehicle | Vehicle |
| 28 | 37.0180 | 22.6503 | 0.2804 | 0.004635 | Vehicle | Vehicle |
| 68 | 36.7006 | 30.9076 | 0.3954 | 0.009074 | Vehicle | Vehicle |
| 8 | 29.4869 | 22.4367 | 0.3547 | 0.009153 | Vehicle | Vehicle |
| 110 | 30.6473 | 41.8409 | 0.3555 | 0.015836 | Vehicle | Vehicle |
| 333 | 0.8558 | 0.7019 | 0.3785 | 0.362776 | Pedestrian | Pedestrian |
| 54 | 1.0175 | 1.1350 | 0.7619 | 0.835267 | Pedestrian | Pedestrian |
| 7 | 9.4177 | 88.4461 | 0.9036 | 0.901179 | Pedestrian | Pedestrian |
| 113 | 2.7480 | 14.9071 | 0.8778 | 1.732968 | Pedestrian | Pedestrian |
| 20 | 1.7048 | 7.8529 | 0.7363 | 1.989632 | Pedestrian | Pedestrian |
| 4 | 0.6230 | 1.2689 | 0.7702 | 2.517617 | Pedestrian | Pedestrian |
| 18 | 0.2203 | 0.3600 | 0.6812 | 5.052807 | Pedestrian | Pedestrian |
| 50 | 0.7892 | 5.2441 | 0.7583 | 6.384557 | Pedestrian | Pedestrian |

TABLE 1-continued

| Probe ID | AVG SPEED | STD SPEED | SINUOSITY | PDM | GROUND TRUTH | PREDICTED |
|---|---|---|---|---|---|---|
| 108 | 0.5949 | 3.4262 | 0.7315 | 7.081006 | Pedestrian | Pedestrian |
| 49 | 0.0455 | 0.1037 | 0.6304 | 31.54192 | Pedestrian | Pedestrian |

Figure 8A:
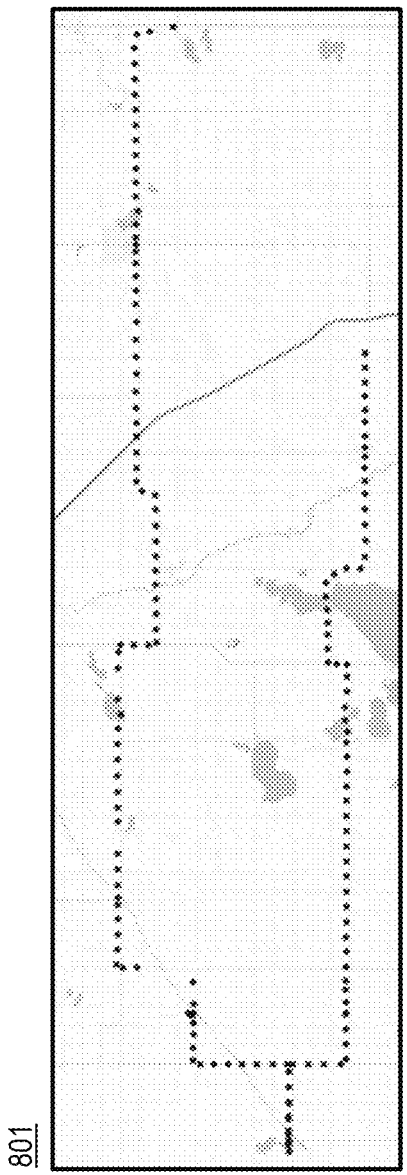
FIGS. 8A-8G are diagrams illustrating probe trajectories used as ground truth data in Table 1 above, according to one embodiment.
Figure 8B:
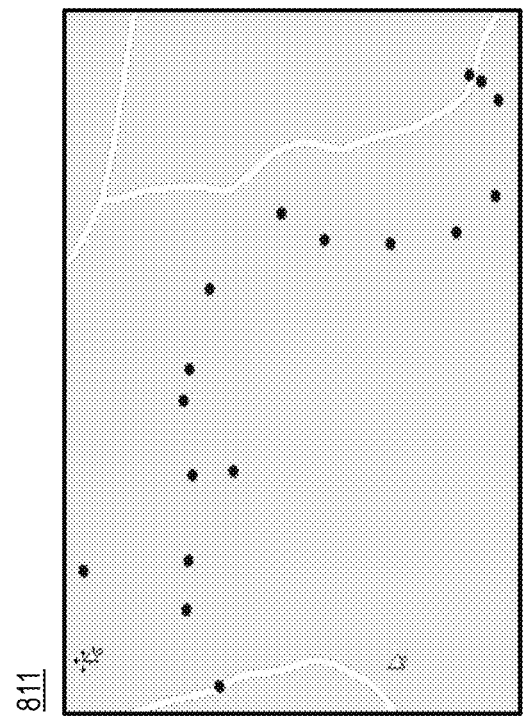
Figure 8C:
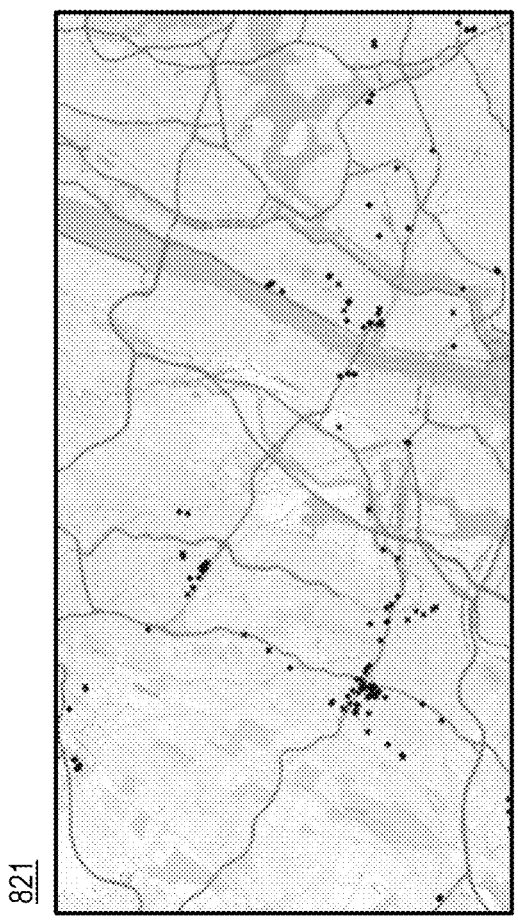
Figure 8D:
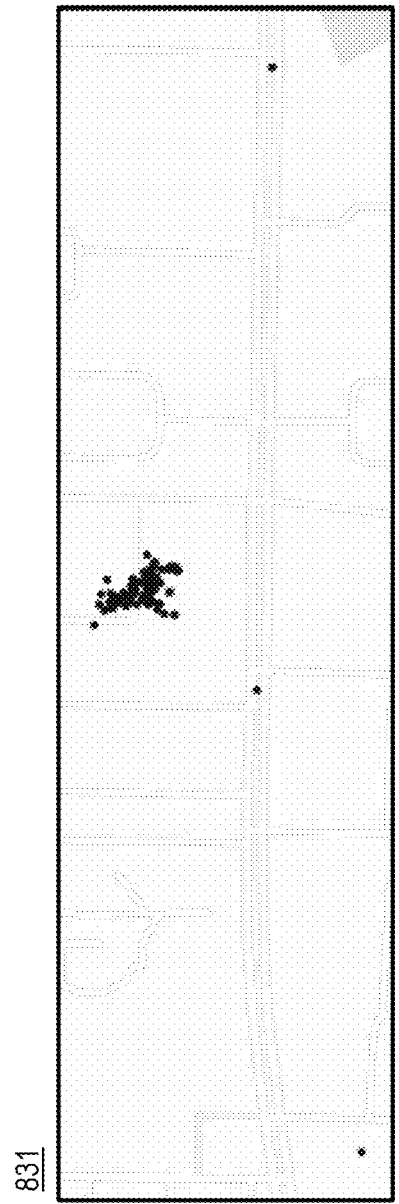
Figure 8E:
Figure 8F:
Figure 8G:
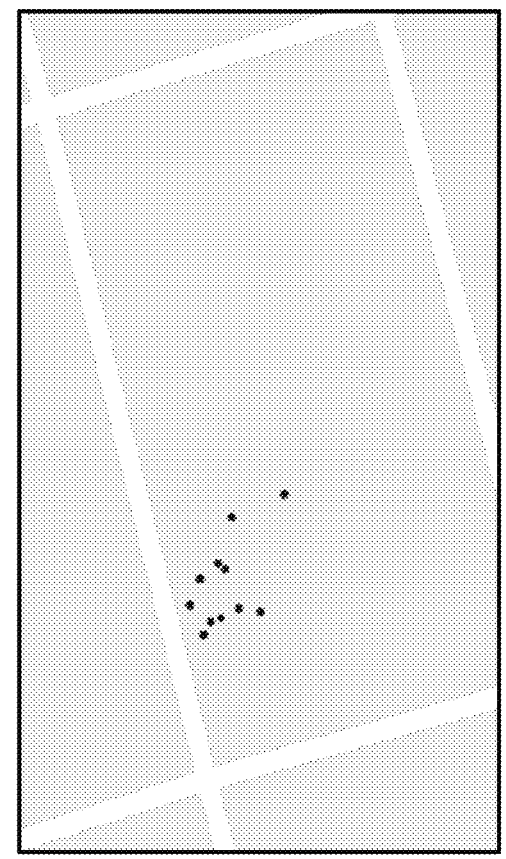

FIGS. 8A-8G are diagrams illustrating probe trajectories used as ground truth data in Table 1 above, according to one embodiment. For example, FIG. 8A depicts a probe trajectory 801 corresponding to Probe ID 50_2 of Table 1 with a calculated PDM of 0.000422 and predicted to be a vehicle probe trajectory based on a PDM threshold of 0.3. FIG. 8B depicts a probe trajectory 811 corresponding to Probe ID 333 of Table 1 with a calculated PDM of 0.362776 and predicted to be a pedestrian probe trajectory. FIG. 8C depicts a probe trajectory 821 corresponding to Probe ID 20 of Table 1 with a calculated PDM of 1.989632 and predicted to be a pedestrian probe trajectory. FIG. 8D depicts a probe trajectory 831 corresponding to Probe ID 50 of Table 1 with a calculated PDM of 6.384557 and predicted to be a pedestrian probe trajectory. FIG. 8E depicts a probe trajectory 841 corresponding to Probe ID 22 of Table 1 with a calculated PDM of 0.001984 and predicted to be a vehicle probe trajectory. FIG. 8F depicts a probe trajectory 851 corresponding to Probe ID 24 of Table 1 with a calculated PDM of 0.002832 and predicted to be a vehicle probe trajectory. FIG. 8G depicts a probe trajectory 861 corresponding to Probe ID 49 of Table 1 with a calculated PDM of 31.54192 and predicted to be a pedestrian probe trajectory.

Figure 9:
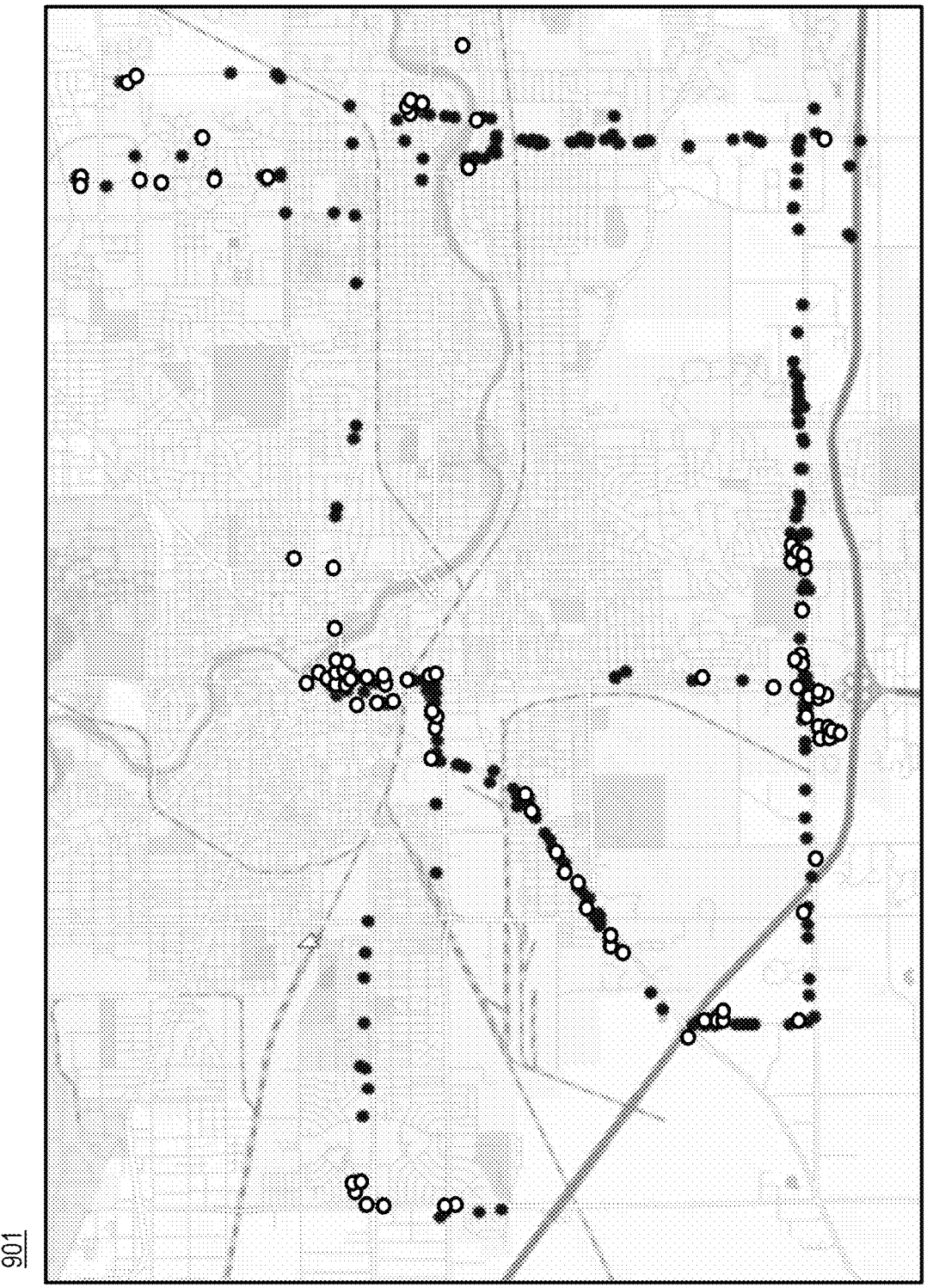
FIG. 9 is a diagram illustrating an example mapping user interface depicting a probe trajectory with classified probes, according to one embodiment.

In one embodiment, the mapping platform 109 can apply the various embodiments described herein for determining a PDM to a probe trajectory that contains both cars and pedestrian data. For example, each individual segment or probe of the trajectory can be evaluated separately to predict whether the segment or probe is a vehicle or a pedestrian probe. FIG. 9 illustrates an example mapping user interface depicting a probe trajectory 901 containing probes that have been classified as either pedestrian (indicated by white dots) or vehicle (indicated by black dots) based on calculated PDM. One embodiment for segmenting a probe trajectory for determining PDM is described in more detail below with respect to FIG. 11.

Figure 10:
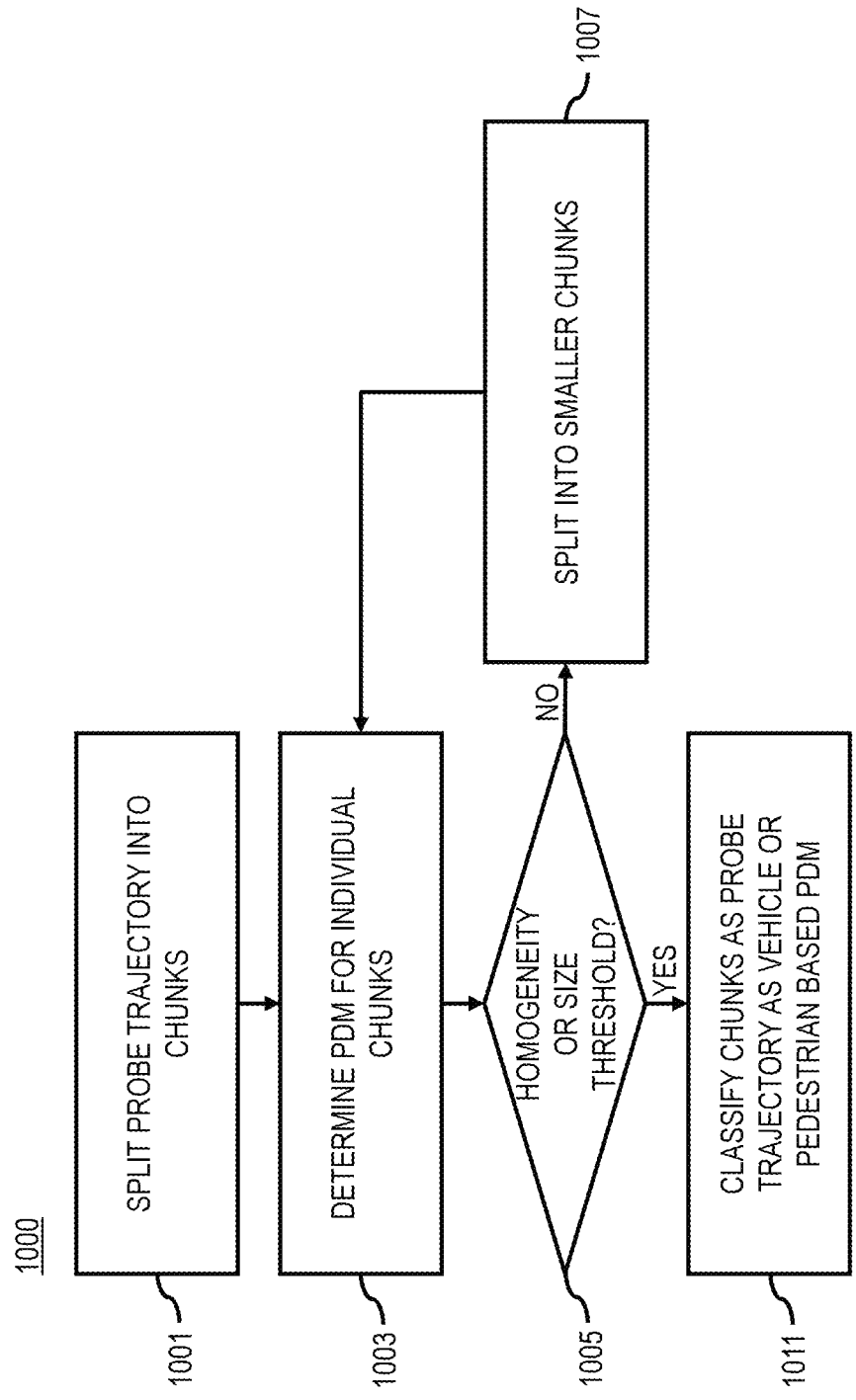
FIG. 10 is a flowchart of a process for partitioning a probe trajectory according to pedestrian and vehicle modes of travel, according to one embodiment.

FIG. 10 is a flowchart of a process for partitioning a probe trajectory according to pedestrian and vehicle modes of travel, according to one embodiment. In various embodiments, the mapping platform 109 and/or any of the modules 301-307 may perform one or more portions of the process 1000 and may be implemented in, for instance, a chip set including a processor and a memory as shown in FIG. 14. As such, the mapping platform 109 and/or any of the modules 301-307 can provide means for accomplishing various parts of the process 1000, as well as means for accomplishing embodiments of other processes described herein in conjunction with other components of the system 100. Although the process 1000 is illustrated and described as a sequence of steps, it is contemplated that various embodiments of the process 1000 may be performed in any order or combination and need not include all of the illustrated steps.

As described above, some individual probe trajectories can include more than one mode of travel as a user travels using different modes of travel (e.g., pedestrian and vehicle). This can occur, for instance, the probe trajectory is recorded using a mobile application 103 executing on a UE 101 that is carried by the user from one mode of travel to another.

Embodiments of the process 1000 can be used to partition this type of probe trajectory to identify which segments or partition are more heavily pedestrian and which are more heavily vehicle.

To initiate this process, in step 1001, the probe data module 301 splits a probe trajectory being evaluated into a plurality of chunks or segments. The splitting of the probe trajectory enables the mapping platform 109 to categorize the chunks individually as pedestrian or vehicle. In one embodiment, the probe data module 301 uses the PDM as its search metric to divide a trajectory into pedestrians and vehicles. In other words, the probe data module 301 takes a divide and conquer approach (binary search) to split the trajectories and test for homogeneity in terms of the PDM value. The probe data module 301 then uses the homogeneity of the PDM value as a criterion to continue a recursive divide and conquer search until the number of probes of the trajectory gets to a designated minimum value or threshold.

Figure 11:
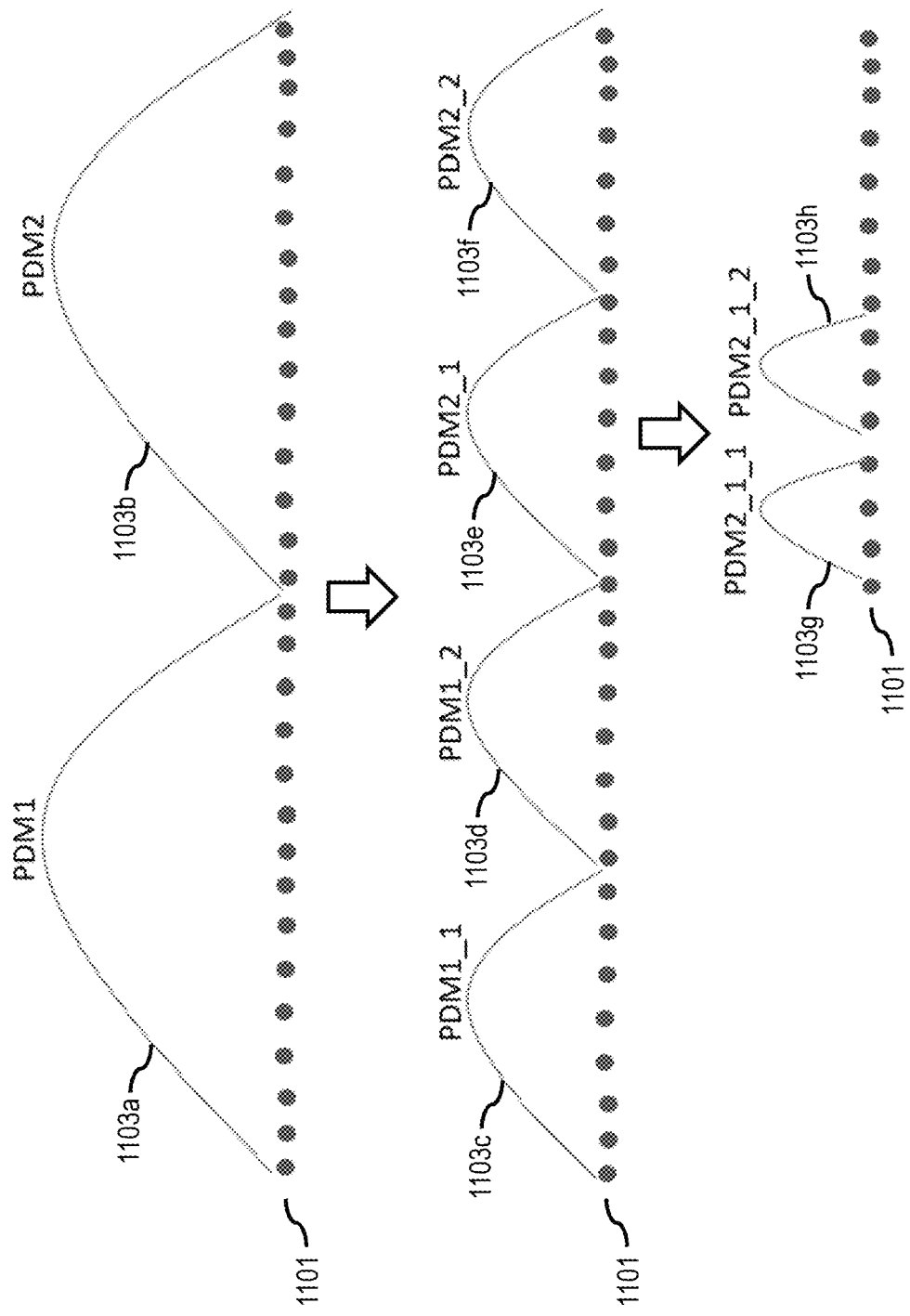
FIG. 11 is a diagram illustrating an example of partitioning a probe trajectory, according to one embodiment.

FIG. 11 is a diagram illustrating an example of partitioning a probe trajectory 1101, according to one embodiment. In one embodiment, the probe data module 301 splits the trajectory in chunks 1103a and 1103b based on length and/or number probes so that each chunk 1103a and 1103b has approximately equal length and/or equal number or probes. This is illustrated in FIG. 4 below. The probe data module 301 uses the ratio of PDM of the left and right chunks to determine if the recursive search should continue. In step 1003, to calculate the ratio, the probe data module 301 first calculates respective PDM values for chunk 1103a (e.g., PDM1) and chunk 1103b (e.g., PDM2). The ratio can then be determined from left to right (e.g., ratio=PDM1/PDM2) or right to left (e.g., ratio=PDM 2/PDM1). In one embodiment, whether the ratio is determined left to right or right to left can depend on which ratio results in a value greater than 1. If the one combination results in a ratio that is greater than one, the other combination is chosen to facilitate comparison against a threshold. The ratio, for instance, is an indicator of how homogenous the PDM of the chunks 1103a and 1003b are relatively to each other. For example, ratios that are closer to 1 indicate that the PDM values of the compared chunks are similar in value (i.e., homogenous), whereas ratios that farther from 1 indicate that the PDM is less homogenous.

In step 1005, the computed ratio can be compared against a homogeneity criterion or threshold. For example, a threshold of value of 0.95 can be used to determine whether chunks are homogenous or not for purposes of the recursive search. This means that if the PDM values deviate by a ratio value<0.95, the values are considered to be not homogenous. In addition or alternatively, other criteria could be applied to ensure the maximum trajectory length is less than a maximum or threshold (configured) number such that the recursive search continues until trajectory is less than max_number_of_probes or threshold (e.g., 100 probes). Accordingly, in step 1007 the probe data module 301 continues the recursive search continues as this is an indication that the data is non-homogenous in terms of purely car or purely pedestrian.

In other words, the probe data module 301 recursively splits the probe trajectory into increasingly or subsequently smaller lengths until the homogeneity criterion is met, until the number or probes or probe points in a chunk is less than a threshold, or a combination thereof. In the example of FIG. 11, the ratio for chunks 1103a and 1103b in the first split is less than the homogeneity criterion. As a result, the probe data module 301 performs a second split of the chunks 1103a and 1103b into smaller chunks 1103c-1103f. The process then continues with determining respective PDM values for each chunk 1103c-1103f (e.g., chunk 1103c=PDM1_1, chunk 1103d=PDM1_2, chunk 1103e=PDM2_1, and chunk 1103f=PDM2_2). The probe data module 301 can then compares each set of two chunks to determine their respective homogeneity ratios. For example, the ratio for chunks 1103c and 1103d can be determined as PDM1_1/PDM1_2 or PDM1_2/PDM1_1, and the ratio for chunks 1103e and 1103f can be determined as PDM2_1/PDM2_2 or PDM2_2/PDM2_1. In this way each pair of chunks can be compared separately to determine whether further recursion or splitting is needed. In the example of FIG. 4, the ratio for chunks 1103c and 1103d is greater than the homogeneity criterion (e.g., 0.95) which indicates that the PDM values for the pair is homogenous. However, the ratio for the chunks 1103e and 1103f is below the homogeneity criterion indicating that the pair is not homogenous. The probe data module 301 can then further split the corresponding chunks 1103e and/or 1103f into even smaller chunks 1103g and 1103h. This recursive process can continue until all chunks are homogenous or until the threshold minimum number probes in each chunk is reached.

In one embodiment, this recursive search helps to ensure that the splitting happens, and all probes of the trajectory are correctly partitioned into either pedestrian or vehicles. the recursive splitting also enables the mapping platform 109 to maximize the amount of pedestrian and/or vehicle specific probe data that can be mined from mix-mode probe data even over applying the embodiments of the PDM process on whole trajectories. For example, when applying the PDM process in combination with trajectory splitting or partitioning on 2000 test probe trajectories in which 22.3% are almost purely pedestrian, 26% are almost purely car probes, and 51.7% are a mixture of both car probes and pedestrian probes. This data, for instance, was obtained from pedestrian data supplier that indicated that only 22% is useful for pedestrian applications if the PDM/trajectory partitioning process is not applied. On applying the embodiments of the PDM/trajectory partitioning process described herein, the following improved statistics were obtained: 55.41% of the data was purely pedestrian and 44.59% was purely vehicular. The mapping platform 109 divided the large trajectories into smaller ones which were purely pedestrian or vehicles and was able to classify the points in trajectories which could not previously be classified as purely pedestrian or vehicle. In addition to the mixed trajectories, many of the purely car trajectories from the original data had some clusters of pedestrian data. These clusters were removed and classified as pedestrian. In summary, the embodiments of the PDM/trajectory partitioning process enabled the mapping platform 109 to classify the 51.7% of mixed trajectories and make the rest of the classifications more robust.

In one embodiment, the mapping platform 103 and/or any of its module 301-307 can execute or include instructions for directing an apparatus (e.g., a processor) to perform the embodiments described herein. The following lists example pseudo-code that can be executed or stored in a non-transitory computer readable storage medium to perform the embodiments of the processes described herein:

```
calcSinuosity(trajectories_list):
    differences_list ← [ ]
    for i in range(0, len(trajectories_list)−1):
        angle ← abs(pi − abs(trajectory_list[i] − trajectory_list[i+1]))
        difference_list.append(abs(cos(angle/2)))
    return average(differences_list)
calcPDM(speeds_list, trajectories_list):
    AVG ← average(speeds_list)
    STD ← standard_deviation(speeds_list)
    SIN ← calcSinuosity(trajectories_list)
    return STD*SIN/(AVG*AVG)
```

Sequential Algorithm:

```
calcClusters(speeds_list, trajectories_list, block_size):
    assert(len(speeds_list) == len(trajectories_list))
    index ← 0
    final_dict ← dict( )
    while index + block_size < len(speeds_list):
        curr_speeds_list ← speeds_list[index : index+block_size]
        curr_trajectories_list ← trajectories_list[index : index+block_size]
        pdm ← calcPDM(curr_speeds_list, curr_trajectories_list)
        temp_dict ← getDict(index, index + block_size, pdm)
        final_dict combine(final_dict, temp_dict)
    curr_speeds_list ← speeds_list[index : len(speeds_list)]
    curr_trajectories_list ← trajectories_list[index : index+block_size]
    pdm ← calcPDM(curr_speeds_list, curr_trajectories_list)
    temp_dict ← getDict(index, index + block_size, pdm)
    return combine(final_dict, temp_dict)
mainSeq(file_name, block_size):
    csv_file ← Extract csv file
    [coordinates, time_stamps] ← getParams(csv_file)
    speeds_list ← getSpeed(coordinates, time_stamps)
    trajectories_list ← getTrajectories(coordinates)
```

```
        start_index ← 0
        end_index ← number of points - 1
        clusters ← calcClusters(speeds_list, trajectories_list, block_size)
        return clusters
```

Recursive Algorithm with Binary Search

```
calcClusters(speeds_list, trajectories_list, start_index, end_index):
        threshold ← 0.95
        if len(speeds_list) < 7:
                return getDict(start, end, calcPDM(speeds, trajectories))
        first ← floor(num_points/2)
        speeds_list1 ← speeds_list[0 : first]
        trajectories_list1 ← trajectories_list[0 : first]
        speeds_list2 ← speeds_list[first: num_points]
        trajectories_list2 ← trajectories list[first : num_points]
        pdm1 ← calcPDM(speeds_list1, trajectories_list1)
        pdm2 ← calcPDM(speeds_list2, trajectories_list2)
        ratio ← pdm1/pdm2
            if ratio < threshold or 1/ratio < threshold or len(speeds) > 100:
                    my_dict1 ← calcClusters(speeds_list1, trajectories_list1, start_index,
start_index + first - 1)
                    my_dict2 ← calcClusters(speeds_list2, trajectories_list2, start_index + first
end_index)
                    my_dict ← combine(my_dict1, my_dict2)
            else:
                    pdm ← calcPDM(speeds_list, trajectories_list)
                    my_dict ← getDict(start_index, end_index, pdm)
        return my_dict
mainRecursive(file_name):
        csv_file ← Extract csv file
        [coordinates, time_stamps] ← getParams(csv_file)
        speeds_list ← getSpeed(coordinates, time_stamps)
        trajectories_list ← getTrajectories(coordinates)
        start_index ← 0
        end_index ← number of points - 1
        clusters ← calcClusters(speeds_list, trajectories_list, start_index, end_index)
        return clusters
```

In one embodiment, the mapping platform 109 can output the mined pedestrian specific and/or vehicle specific probe trajectories for any number of use cases. For example, the PDM-classified probe trajectories can be used for selective content (e.g., advertisement) by showing content or advertisements differently based on a mobile device's (e.g., UE 101) mode of transportation, e.g., pedestrian (walking) or car (driving) mode. Another example includes using the classified probe trajectories in application by a person to obtain information such as fitness plans (when walking), etc.

Returning to FIG. 1, in one embodiment, the mapping platform 109 of system 100 has access to a geographic database 113 to provide location-based services. The mapping platform 109 can operate, for instance, in connection with one or more UEs 101 (e.g., mobile devices) that can be carried by a user as a pedestrian or in a car (e.g., vehicle 107). Though depicted as automobiles, it is contemplated the vehicles 107 can be any type of transportation vehicle manned or unmanned (e.g., planes, aerial drone vehicles, motor cycles, boats, bicycles, etc.). Alternatively, the UE 101 may be operated by one or more pedestrians 105 as a personal navigation device ("PND"), a cellular telephone, a mobile phone, a personal digital assistant ("PDA"), a watch, a camera, a computer and/or any other device that supports location-based services, i.e., digital routing and map display. It is contemplated that a device employed by a pedestrian may be interfaced with an on-board navigation system of a vehicle 101 or wirelessly/physically connected to the vehicle 107 to serve as the navigation system. Also, the UE 101 may be configured to access the communication network 121 by way of any known or still developing communication protocols.

Also, the UE 101 may be configured with an application 103 for collecting probe data and/or for interacting with one or more content providers 117, services 115 of a service platform 113, or a combination thereof. The application 103 may be any type of application that is executable on the UE 101, such as mapping applications, location-based service applications, navigation applications, content provisioning services, camera/imaging applications, media player applications, social networking applications, calendar applications, and the like. In one embodiment, the application 103 may act as a client for the mapping platform 109 and perform one or more functions of the mapping platform 109 alone or in combination with the mapping platform 109. In yet another embodiment, the content providers 117, services 115, and/or service platform 113 receive the PDM-classified probe data for executing its functions and/or services.

The UE 101 may be configured with various sensors (not shown for illustrative convenience) for acquiring and/or generating probe data associated with a vehicle 107, a driver, a pedestrian 105, other vehicles, conditions regarding the driving environment or roadway, etc. For example, sensors may be used as GPS receivers for interacting with one or more satellites 123 to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the vehicle 107 and/or UEs 101. Still further, the sensors may detect local or transient network and/or wireless signals, such as those transmitted by nearby devices during navigation of a vehicle along a roadway (Li-Fi, near field communication (NFC)) etc. This may include, for example, network routers configured within a premise (e.g., home or business), another UE 101 or vehicle or a communicable traffic system (e.g., traffic lights, traffic cameras, traffic signals, digital signage).

It is noted therefore that the above described data may be transmitted via communication network 121 as probe data (e.g., GPS probe data) according to any known wireless communication protocols. For example, each UE 101, mobile application 103, user, pedestrian 105, and/or vehicle 107 may be assigned a unique probe identifier (probe ID) for use in reporting or transmitting said probe data collected by the vehicles 107 and UEs 101. In one embodiment, each vehicle 107 and/or UE 101 is configured to report probe data as probe points, which are individual data records collected at a point in time that records telemetry data. Probes or probe points can be collected by the system 100 from the UEs 101, applications 103, and/or vehicles 107 in real-time, in batches, continuously, or at any other frequency requested by the system 100 over, for instance, the communication network 121 for processing by the mapping platform 109.

In one embodiment, the mapping platform 109 retrieves aggregated probe points gathered and/or generated by UE 101 resulting from the travel of UEs 101, pedestrians 105 and vehicles 107 on a road segment. The probe database 111 stores a plurality of probe points and/or trajectories generated by different UEs 101, applications 103, pedestrians 105, vehicles 107, etc. over a period relative while traveling in a monitored area. A time sequence of probe points specifies a trajectory—i.e., a path traversed by a UE 101, application 103, pedestrians 105, vehicles 107, etc. over a period of time.

In one embodiment, the communication network 121 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 109 may be a platform with multiple interconnected components. The mapping platform 109 may include multiple servers, intelligent networking devices, computing devices, components and corresponding software for minding pedestrian and/or vehicle specific probe data from mix-mode probe data. In addition, it is noted that the mapping platform 109 may be a separate entity of the system 100, a part of the one or more services 115 of the services platform 113, or included within the UE 101 (e.g., as part of the applications 103).

In one embodiment, the content providers 119 may provide content or data (e.g., probe data) to the components of the system 100. The content provided may be any type of content, such as probe data, location data, textual content, audio content, video content, image content, etc. In one embodiment, the content providers 119 may provide mix-mode probe trajectories. In one embodiment, the content providers 119 may also store content associated with the vehicles 107, the UE 101, the mapping platform 109, and/or the services 115. In another embodiment, the content providers 119 may manage access to a central repository of data, and offer a consistent, standard interface to data, such as a trajectories database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques or processes for retrieving and/or accessing trajectory or probe data from one or more sources may be employed by the mapping platform 109.

By way of example, the UE 101, application 103, pedestrians 105, vehicles 107, and mapping platform 109 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
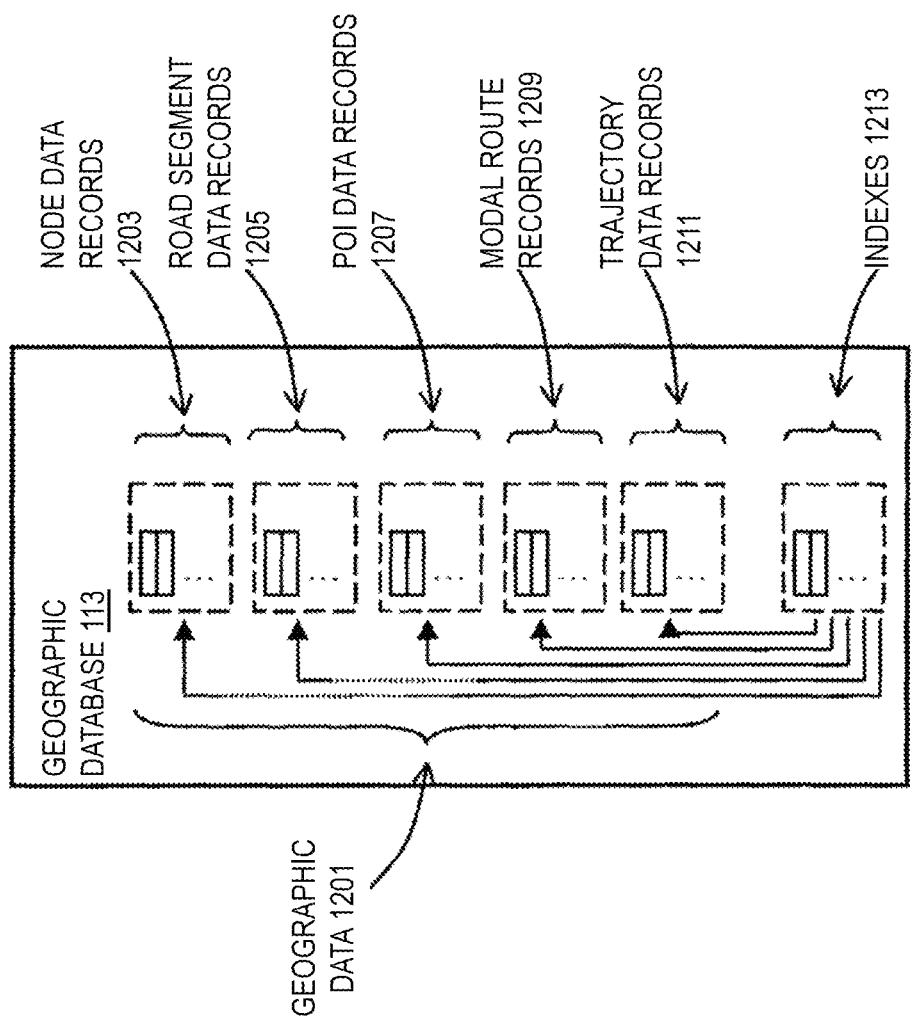
FIG. 12 is a diagram of a geographic database, according to one embodiment.

FIG. 12 is a diagram of the geographic database 113 of system 100, according to exemplary embodiments. In the exemplary embodiments, modal routes, trajectories (sequences of probe points), road segments, lane model information and/or other related information can be stored, associated with, and/or linked to the geographic database 113 or data thereof. In one embodiment, the geographic database 113 includes geographic data 1201 used for (or configured to be compiled to be used for) mapping and/or navigation-related services, such as for personalized route determination, according to exemplary embodiments. For example, the geographic database 113 includes node data records 1203, road segment or link data records 1205, POI data records 1207, modal route records 1209, and trajectory data records 1211, for example. More, fewer or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques), for example.

In exemplary embodiments, the road segment data records 1205 are links or segments representing roads, streets, or paths, as can be used in the calculated route or recorded route information for determination of one or more personalized routes, according to exemplary embodiments. The node data records 1203 are end points corresponding to the respective links or segments of the road segment data records 1205. The road link data records 1205 and the node data records 1203 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1207. The geographic database 113 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In addition, the geographic database 113 can include data about determined modal routes and their respective origin and destination locations in the modal route records 1209. By way of example, modal routes for different time periods and contexts (e.g., season, day of the week, time of day, mode of transportation, etc.) can be determined and stored in the modal route records 1209 for subsequent retrieval or access. In addition, trajectory and/or probe data processed by the system 100 can be stored in the trajectory data records 1211. For example, trimmed or simplified trajectories can be stored in the trajectory data records 1211 for later retrieval or access.

The geographic database 113 can be maintained by the content provider 119 in association with the services platform 113 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., vehicle 107, UE 101, etc.) to provide navigation-related functions. For example, the geographic database 113 can be used with the end user device to provide an end user with navigation features. In such a case, the geographic database 113 can be downloaded or stored on the end user device (e.g., vehicle 107, UE 101, etc.), such as in application 103, or the end user device can access the geographic database 113 through a wireless or wired connection (such as via a server and/or the communication network 121), for example.

The processes described herein for mining pedestrian probe data from mix-mode probe data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
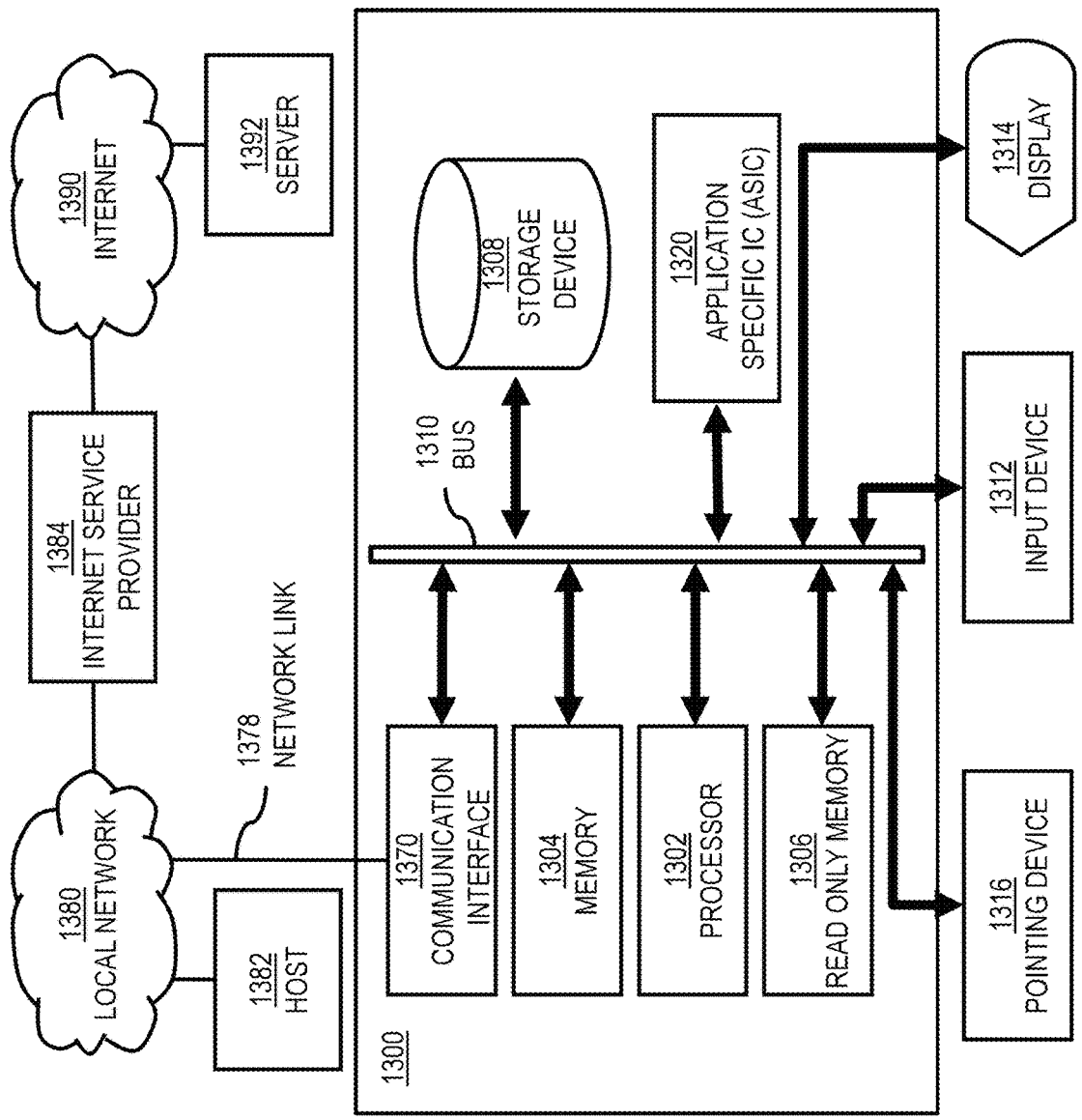
FIG. 13 is a diagram of hardware that can be used to implement an embodiment of the invention.

FIG. 13 illustrates a computer system 1300 upon which an embodiment of the invention may be implemented. Computer system 1300 is programmed (e.g., via computer program code or instructions) to min pedestrian probe data from mix-mode probe data as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to mining pedestrian probe data from mix-mode probe data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for mining pedestrian probe data from mix-mode probe data. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for mining pedestrian probe data from mix-mode probe data, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 121 for mining pedestrian probe data from mix-mode probe data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 14 illustrates a chip set 1400 upon which an embodiment of the invention may be implemented. Chip set 1400 is programmed to mine pedestrian probe data from mix-mode probe data as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to mine pedestrian probe data from mix-mode probe data. The memory 1405 also stores the data associated with or generated by the execution of the inventive steps.

Figure 15:
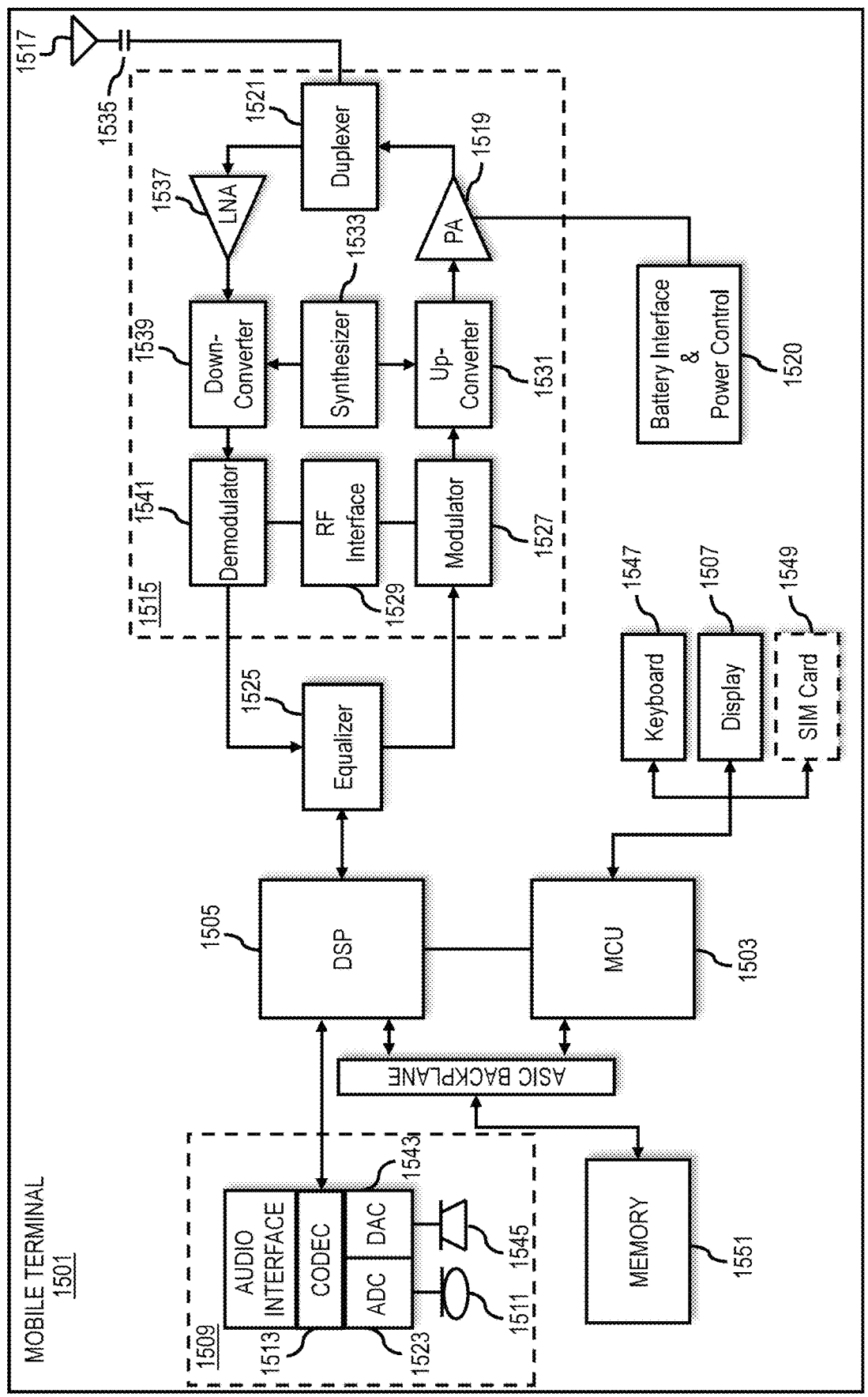
FIG. 15 is a diagram of a mobile terminal (e.g., handset) that can be used to implement an embodiment of the invention.

FIG. 15 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to mine pedestrian probe data from mix-mode probe data. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for mining pedestrian probe data from mix-mode probe data, the method comprising:
    collecting a probe trajectory from a sensor of user equipment;
    via a network, receiving at a server, the probe trajectory including a vehicle mode of travel, a pedestrian mode of travel, or a combination thereof;
    processing, via at least one processor, the probe trajectory to determine at least one speed value and at least one sinuosity value;
    determining, via the at least one processor, a pedestrian probe detection metric indicating an amount of pedestrian data in the probe trajectory based on the at least one speed value and the at least one sinuosity value;
    ranking, via the at least one processor, the probe trajectory among a plurality of probe trajectories based on the pedestrian probe detection metric;
    splitting, via the at least one processor, the probe trajectory into a plurality of chunks;
    classifying, via the at least one processor, the probe trajectory as either a vehicle probe trajectory or a pedestrian probe trajectory based on the pedestrian probe detection metric;
    receiving, via the network, the classified pedestrian probe trajectory and classified vehicle probe trajectory based on the pedestrian probe detection metric at a user device, and
    displaying, in a mapping user interface of the user device, wherein the pedestrian probe detection metric is determined individually for the plurality of chunks, and
    wherein the splitting is further based on length and a number of probes points so that each of the plurality of chunks has equal length and equal probes.

2. The method of claim 1, further comprising:
    storing a designated top percentage of the plurality of probe trajectories based on the ranking.

3. The method of claim 1, further comprising:
    classifying the probe trajectory as either the vehicle probe trajectory or the pedestrian probe trajectory based on the pedestrian probe detection metric.

4. The method of claim 3, wherein the classifying of the probe trajectory is based on comparing the pedestrian probe detection metric to a threshold.

5. The method of claim 1, wherein the at least one speed value includes a speed standard deviation value and an average speed value of the probe trajectory.

6. The method of claim 3, wherein a higher standard deviation value for the speed standard deviation value increases the pedestrian probe detection metric, and wherein a higher speed value for the average speed value decreases the pedestrian probe detection metric.

7. The method of claim 1, wherein the at least one sinuosity value is based on one or more turn angles indicated in the probe trajectory.

8. The method of claim 5, wherein a higher value for the at least one sinuosity score increases the pedestrian probe detection metric.

9. The method of claim 1, wherein the probe trajectory is recursively split into subsequently smaller lengths until a homogeneity criterion is met, until a number or probe points in a chunk of the plurality of chunks is less than a threshold, or a combination thereof.

10. An apparatus for mining pedestrian probe data from mix-mode probe data comprising:
at least one processor; and
at least one memory including computer program code for one or more programs,
the at least one memory and the computer program code configured to, with the at least one processor, cause the apparatus to perform:
collecting a probe trajectory from a sensor of user equipment;
via a network, receive at a server, the probe trajectory including a vehicle mode of travel, a pedestrian mode of travel, or a combination thereof;
process, via the at least one processor, the probe trajectory to determine at least one speed value and at least one sinuosity value;
determine, via the at least one processor, a pedestrian probe detection metric indicating an amount of pedestrian data in the probe trajectory based on the at least one speed value and the at least one sinuosity value;
rank, via the at least one processor, the probe trajectory among a plurality of probe trajectories based on the pedestrian probe detection metric;
split, via the at least one processor, the probe trajectory into a plurality of chunks;
classify, via the at least one processor, the probe trajectory as either a vehicle probe trajectory or a pedestrian probe trajectory based on the pedestrian probe detection metric;
receive, via the network, the classified pedestrian probe trajectory and classified vehicle probe trajectory based on the pedestrian probe detection metric at a user device, and
display, in a mapping user interface of the user device, wherein the pedestrian probe detection metric is determined individually for the plurality of chunks,
wherein the split is further based on length and a number of probes points so that each of the plurality of chunks has equal length and equal probes.

11. The apparatus of claim 10, wherein the apparatus is further caused to:
store a designated top percentage of the plurality of probe trajectories based on the ranking.

12. The apparatus of claim 10, wherein the probe trajectory is recursively split into subsequently smaller lengths until a homogeneity criterion is met, until a number or probe points in a chunk of the plurality of chunks is less than a threshold, or a combination thereof.

13. A non-transitory computer-readable storage medium carrying one or more sequences of one or more instructions which, when executed by one or more processors, cause an apparatus to at least perform the following steps:
collecting a probe trajectory from a sensor of user equipment;
via a network, receiving at a server, the probe trajectory including a vehicle mode of travel, a pedestrian mode of travel, or a combination thereof;
processing, via the one or more processors, the probe trajectory to determine at least one speed value and at least one sinuosity value;
determining, via the one or more processors, a pedestrian probe detection metric indicating an amount of pedestrian data in the probe trajectory based on the at least one speed value and the at least one sinuosity value;
ranking, via the at least one processor, the probe trajectory among a plurality of probe trajectories based on the pedestrian probe detection metric;
splitting, via the at least one processor, the probe trajectory into a plurality of chunks;
classifying, via the at least one processor, the probe trajectory as either a vehicle probe trajectory or a pedestrian probe trajectory based on the pedestrian probe detection metric;
receiving, via the network, the classified pedestrian probe trajectory and classified vehicle probe trajectory based on the pedestrian probe detection metric at a user device, and
displaying, in a mapping user interface of the user device, wherein the pedestrian probe detection metric is determined individually for the plurality of chunks, and
wherein the splitting is further based on length and a number of probes points so that each of the plurality of chunks has equal length and equal probes.

14. The non-transitory computer-readable storage medium of claim 13, wherein the apparatus is caused to further perform:
ranking the probe trajectory among a plurality of probe trajectories based on the pedestrian probe detection metric; and
storing a designated top percentage of the plurality of probe trajectories based on the ranking.

15. The non-transitory computer-readable storage medium of claim 13, wherein the probe trajectory is recursively split into subsequently smaller lengths until a homogeneity criterion is met, until a number or probe points in a chunk of the plurality of chunks is less than a threshold, or a combination thereof.

* * * * *